United States Patent
Liu et al.

(10) Patent No.: US 11,184,553 B1
(45) Date of Patent: Nov. 23, 2021

(54) IMAGE SIGNAL PROCESSING IN MULTI-CAMERA SYSTEM

(71) Applicant: QUALCOMM Incorporated, San Diego, CA (US)

(72) Inventors: Tai-Hsin Liu, Taipei (TW); Wei-Chih Liu, Taipei (TW); Wen-Chun Feng, Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/029,526

(22) Filed: Sep. 23, 2020

(51) Int. Cl.
*H04N 5/235* (2006.01)
*H04N 5/225* (2006.01)
*H04N 5/262* (2006.01)

(52) U.S. Cl.
CPC ......... *H04N 5/2355* (2013.01); *H04N 5/2258* (2013.01); *H04N 5/2621* (2013.01); *H04N 5/2628* (2013.01)

(58) Field of Classification Search
CPC .. H04N 5/2355; H04N 5/2621; H04N 5/2628; H04N 5/2258
See application file for complete search history.

(56) References Cited

U.S. PATENT DOCUMENTS

| | | | |
|---|---|---|---|
| 8,824,793 B2 | 9/2014 | Intwala et al. | |
| 9,497,380 B1* | 11/2016 | Jannard | H04N 5/247 |
| 9,973,672 B2 | 5/2018 | Du et al. | |
| 10,469,760 B2 | 11/2019 | Igor' Valer'evich | |
| 10,735,698 B2 | 8/2020 | Siddiqui et al. | |
| 2008/0193049 A1* | 8/2008 | Onomura | H04N 9/045 382/300 |
| 2015/0078661 A1 | 3/2015 | Granados et al. | |
| 2019/0139189 A1 | 5/2019 | Srinivasamurthy et al. | |
| 2019/0213714 A1 | 7/2019 | Neti et al. | |
| 2019/0222738 A1 | 7/2019 | Galor Gluskin | |
| 2020/0077031 A1* | 3/2020 | Lee | H04M 1/02 |
| 2020/0174240 A1* | 6/2020 | Kang | G02B 21/06 |

OTHER PUBLICATIONS

Digital Cameras: "High Dynamic Range (HDR) Photography," 23 pages. (No Date).
Gong J., et al., "Using Depth Mapping to realize Bokeh effect with a single camera Android device EE368 Project Report,", 9 pages. (No Date).
U.S. Appl. No. 16/667,662, filed Oct. 29, 2019, 54 Pages.

* cited by examiner

*Primary Examiner* — Yogesh K Aggarwal
(74) *Attorney, Agent, or Firm* — Qualcomm Incorporated

(57) ABSTRACT

A processor generates a depth map from two images, including a high-dynamic range (HDR) image. The processor receives, from a first image sensor, one or more first images, wherein the one or more first images have a first field-of-view (FOV) and a first resolution, and receives, from a second image sensor, one or more second images, wherein the one or more second images have a second FOV and a second resolution. The processor generates a first HDR image from the one or more first images, and performs tone alignment on the one or more second images based on the first HDR image to produce a second HDR image. The processor generates a depth map using the first HDR image and the second HDR image. The processor may use the depth map to apply a bokeh effect to the first HDR image.

29 Claims, 9 Drawing Sheets

IMAGE SIGNAL PROCESSING IN MULTI-CAMERA SYSTEM

TECHNICAL FIELD

The disclosure relates to image capture and processing.

BACKGROUND

Image capture devices are incorporated into a wide variety of devices. In this disclosure, an image capture device refers to any device that can capture one or more digital images, including devices that can capture still images and devices that can capture sequences of images to record video. By way of example, image capture devices may comprise stand-alone digital cameras or digital video camcorders, camera-equipped wireless communication device handsets, such as mobile telephones having one or more cameras, cellular or satellite radio telephones, camera-equipped personal digital assistants (PDAs), panels or tablets, gaming devices, computer devices that include cameras, such as so-called "web-cams," or any devices with digital imaging or video capabilities.

Images captured by digital cameras are most commonly Low Dynamic Range (LDR) images (sometimes referred to as Standard Dynamic Range or SDR). Images captured in LDR/SDR may, in some lighting situations, include a loss of detail in bright or dark areas of a picture depending on the exposure settings of a camera. A High Dynamic Range (HDR) image can more accurately represent dark areas (e.g., shadows) and well-lit areas (e.g., sunlight), as an HDR image generally includes more possible levels of brightness (e.g., luminance). In some examples, an HDR image can be generated by combining multiple LDR images at different exposure settings.

Image capture devices may include multiple image sensors and/or multiple lenses that may be used to support various imaging techniques, such as high-dynamic-range imaging (HDRI), multi-frame HDRI (MFHDRI), etc. The image sensors, in turn, may transfer the image data to a camera processor. Example lens types include wide-angle lenses, ultra-wide-angle lenses, telephoto lenses, telescope lenses, periscope-style zoom lenses, fisheye lenses, macro lenses, prime lenses, or various combinations thereof. As an example, an image capture device having a dual-camera configuration may include a wide lens and a telephoto lens. Similarly, a triple-camera configuration may include an ultra-wide lens, in addition to a wide lens and a telephoto lens. By using multiple lenses and/or image sensors, camera processors of image capture devices may capture images having various fields-of-view (FOVs), adjust zoom levels, apply focusing effects, and/or create one or more composite frames of image data (e.g., images generated from a combination of multiple images).

Some example image processing techniques may rely on image segmentation algorithms that divide an image into multiple segments which can be analyzed or processed to produce specific image effects. Some example practical applications of image segmentation include, without limitation, digital depth-of-field effects (e.g., a "bokeh" or "portrait mode" effect), chroma key compositing, feature extraction, recognition tasks (e.g., object and face recognition), machine vision, and medical imaging. However, current image segmentation techniques can often yield poor segmentation results and, in many cases, are only suitable for a specific type of image.

SUMMARY

In general, this disclosure describes camera processing techniques involving high-dynamic range (HDR) imaging and/or depth map calculation for image effects based on segmentation, such as depth-of-field effects (e.g., bokeh effects). In general, image segmentation is the process of dividing an image into multiple segments (e.g., representing sets of pixels and/or features of the image). In some examples, image segmentation may be used to identify the location and boundaries of objects and other features in an image. Image effects based on segmentation may include any image effect where the application of such an effect is applied to certain portions of an image or certain features of an image. In some examples, portions or features of an image may be segmented based on a depth value determined for such portions of features of the image. That is, different regions or features of an image may be associated with different depth values.

In some example techniques, when applying a bokeh effect to an HDR image, an imaging device may be configured to output an HDR image with a primary camera (e.g., a master camera) and output another, non-HDR image with a secondary camera (e.g., a slave camera). The non-HDR image, together with the HDR image, is used to calculate the depth map for use in the bokeh effect. However, the non-HDR image may be under exposed or over exposed because the secondary camera is capturing the same HDR scene as the primary camera. Thus, the non-HDR image output from the secondary camera may exhibit a considerable loss of detail relative to the HDR image generated from the primary camera. As such, any depth map calculated from such an image may lack accuracy, thus affecting the quality of any bokeh effect applied on the basis of such a depth map. Similarly, such a depth map may also lack accuracy for other image effects based on image segmentation.

The aforementioned problems may be addressed by the HDR synchronization techniques described in this disclosure. As will be explained in greater detail below, a camera processor of an imaging device may be configured to determine the field-of-view (FOV) and resolution of the image(s) output by a primary camera. The camera processor may process the image(s) output by the primary camera to produce an HDR image. The camera processor may instruct a secondary camera to synchronize both the FOV and resolution of the image(s) output by the secondary camera to be the same as the FOV and resolution of the images output by the primary camera. The camera processor may then perform a tone alignment on the image(s) output by the secondary camera in order to match the range of tones present in the HDR image produced from the images output by the primary camera.

In one example, the camera processor may achieve the tone alignment by performing the same HDR process used on the image(s) received from the primary camera on the image(s) received from the secondary camera. In another example, the camera may perform the tone alignment using a different HDR technique on the image(s) received from the secondary camera, where the different HDR technique approximates the tone range produced by the HDR technique used on the image(s) output by the primary camera. In this way, the camera processor may calculate a depth map using two HDR images that are synchronized in FOV, resolution, and tone, thus improving the accuracy of the depth map. The more accurate depth map may then improve the quality of any image effects based on image segmentation, such as depth-of-field effects, including a bokeh effect, that are applied to images using the calculated depth map.

In one example, the techniques of the disclosure are directed a method of camera processing, the method comprising receiving, from a first image sensor, one or more first images, wherein the one or more first images have a first field-of-view (FOV) and a first resolution, generating a first high-dynamic range (HDR) image from the one or more first images, generating a second HDR image, and generating a depth map using the first HDR image and the second HDR image.

In another example, the techniques of the disclosure are directed to a device configured for camera processing, the device comprising a memory configured to receive images, and one or more processors in communication with the memory, the one or more processors configured to receive, from a first image sensor, one or more first images, wherein the one or more first images have a first FOV and a first resolution, generate a first HDR image from the one or more first images, generate a second HDR image, and generate a depth map using the first HDR image and the second HDR image.

The disclosure also describes means for performing any of the techniques described herein. In an example, the techniques of the disclosure are directed to an apparatus configured to perform camera processing, the apparatus comprising means for receiving, from a first image sensor, one or more first images, wherein the one or more first images have a first FOV and a first resolution, means for generating a first HDR image from the one or more first images, means for generating a second HDR image, and means for generating a depth map using the first HDR image and the second HDR image.

In another example, this disclosure describes a non-transitory computer-readable storage medium storing instructions that, when executed, cause one or more processors to receive, from a first image sensor, one or more first images, wherein the one or more first images have a first FOV and a first resolution, generate a first HDR image from the one or more first images, generate a second HDR image, and generate a depth map using the first HDR image and the second HDR image.

This summary is intended to provide an overview of the subject matter described in this disclosure. It is not intended to provide an exclusive or exhaustive explanation of the systems, device, and methods described in detail within the accompanying drawings and description herein. Further details of one or more examples of the disclosed technology are set forth in the accompanying drawings and in the description below. Other features, objects, and advantages of the disclosed technology will be apparent from the description, drawings, and claims.

BRIEF DESCRIPTION OF DRAWINGS

Like reference characters denote like elements throughout the description and figures.

DETAILED DESCRIPTION

Figure 1:
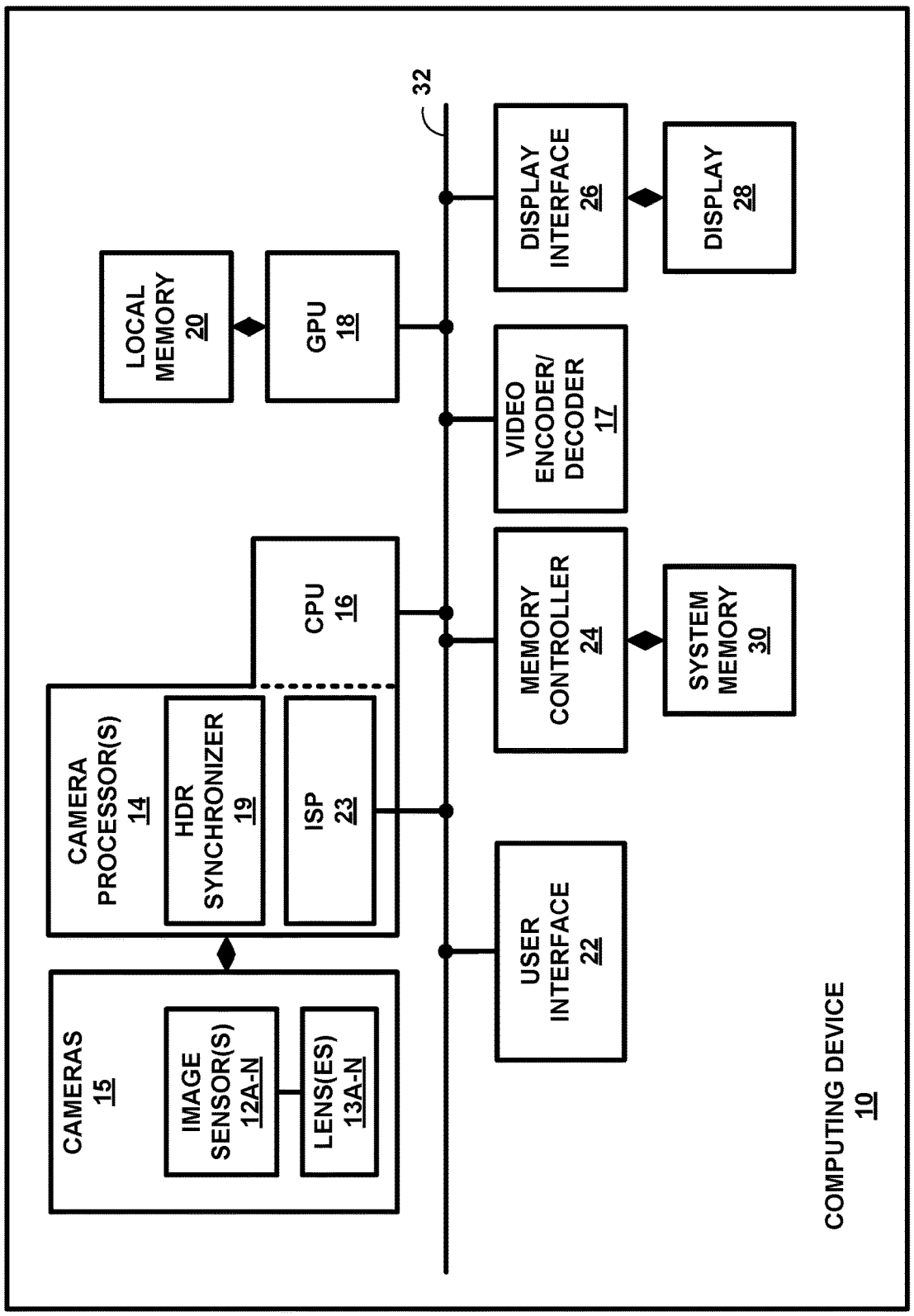
FIG. 1 is a block diagram of a device configured to perform one or more of the example techniques described in this disclosure.

In some digital camera applications, depth maps are used to perform one or more image effects on images based on image segmentation, such as depth-of-field effects. In general, image segmentation is the process of dividing an image into multiple segments (e.g., representing sets of pixels and/or features of the image). In some examples, image segmentation may be used to identify the location and boundaries of objects and other features in an image. Image effects based on segmentation may include any image effect where the application of such an effect is applied to certain portions of an image or certain features of an image. In some examples, portions or features of an image may be segmented based on a depth value determined for such portions of features of the image. That is, different regions or features of an image may be associated with different depth values.

A depth map includes depth values that represent the distance of each pixel, region, and/or feature of an image relative to the image sensor, or the distance of each pixel, region, and/or feature of an image relative to a focal point. In some examples a depth map may include depth values relative to some fixed point (e.g., the camera sensor). In other examples, a depth map may include disparity values associated with depth. For example, the disparity values may indicate the relative distance between features in an image. The disparity values may be used to determine final depth values relative to some spatial offset.

One example depth-of-field effect is a bokeh effect. Bokeh is defined as the effect of a soft out-of-focus background that is achieved when photographing a subject in the foreground (e.g., a subject of portraiture). In traditional digital single lens reflex (DSLR) cameras, different bokeh effects may be achieved by using different lenses with different fields-of-view and lens geometries. Bokeh effects are often aesthetically pleasing for portraits when using a telephoto lens at approximately 2× zoom.

A bokeh effect can also be achieved using post-processing and depth maps on devices with smaller form factors (e.g., mobile phones), even if the camera lenses on such devices do not inherently produce a bokeh effect. For example, a mobile device may include multiple cameras and may capture images with two different cameras at the same time or near in time. Because these two cameras are separated by a physical distance, the depth (e.g., distance from the camera sensor) of features in a first image of the two images can be calculated based on a comparison of the features in the first image to the features in the second image. A bokeh effect process may then use the calculated depth map to blur pixels in the image. For example, pixels and/or features at a depth that matches the focus distance of the image are kept in focus, while pixels that are farther away from the focus distance are blurred. In one example, pixels and/or features that are not at the same depth as the focus distance are all blurred at the same rate. In another example, the farther away a pixel and/or feature is from the focal distance, the more blur that may be applied by the bokeh effect.

In some examples, it may be desirable to apply a bokeh effect, or other image effect based on image segmentation, to a high-dynamic range (HDR) image. An HDR image is generally an image that is generated in a manner such that a wide range of brightness levels (e.g., luminance levels) are generated from a scene at a relatively high level of detail. In most imaging devices, the degree of exposure of light applied to an image sensor can be altered in one of two ways: by either increasing/decreasing the size of an aperture or by increasing/decreasing the time of each exposure (e.g., by adjusting a shutter speed). Due to the physics of camera sensors, it may not be possible to capture all of the brightness levels present in a scene that has a very wide range of brightness levels. That is, a camera sensor may not be capable of recording all of the brightness levels in a scene that are perceptible by the human eye.

For example, to maintain detail in darker areas of a scene, a camera may decrease the shutter speed and/or increase the aperture size. However, this will cause brighter areas to be over exposed (e.g., the image sensor output will output the maximum brightness level for many different actual brightness levels), and detail will be lost in brighter areas. To maintain detail in brighter areas, a camera may increase the shutter speed and/or decrease the aperture size. However, this will cause darker areas to be under exposed (e.g., the image sensor output will output the minimum brightness level for many different actual brightness levels), and detail will be lost in these darker areas.

In some examples, a camera may be configured to generate an HDR image by capturing multiple images at varying exposure settings and then combining the multiple images to form a final image that more accurately represents all of the brightness levels present in the seen. In some examples, exposure variation for HDR generation is done by only altering the exposure time and not the aperture size. This is because altering the aperture size may also affect the depth of field of each of the output images, which may not be desirable in some applications. In other applications, the camera may adjust both aperture and shutter speed to output the multiple images used to form an HDR image.

However, in some example techniques, when applying a bokeh effect, or other effect based on image segmentation, to an HDR image, an imaging device may be configured to generate an HDR image with a primary camera (e.g., a master camera) and generate another, non-HDR image with a secondary camera (e.g., a slave camera). The non-HDR image, together with the HDR image, is used to calculate the depth map for use in the bokeh effect. However, the non-HDR image may be under exposed or over exposed because the secondary camera is capturing the same HDR scene as the primary camera. Thus, the non-HDR image generated by the secondary camera may exhibit a considerable loss of detail relative to the HDR image generated from the images produced by the primary camera. As such, any depth map calculated from such an image may lack accuracy, thus affecting the quality of any bokeh effect applied on the basis of such a depth map.

The aforementioned problems may be addressed by the HDR synchronization techniques described in this disclosure. As will be explained in greater detail below, a camera processor of an imaging device may be configured to determine the field-of-view (FOV) and resolution of the image(s) output by a primary camera. The camera processor may process the image(s) received from the primary camera to produce an HDR image. The camera processor may synchronize both the FOV and resolution of the image(s) output by the secondary camera to be the same as the FOV and resolution of the images output by the primary camera. The camera processor may also generate an HDR image from the output of the secondary camera. For example, the camera processor may perform a tone alignment on the image(s) output by the secondary camera in order to match the range of tones present in the HDR image produced from the images output by the primary camera.

In one example, the camera processor may achieve the tone alignment by performing the same HDR process used on the image(s) received from the primary camera on the image(s) received from the secondary camera. In another example, the camera may perform the tone alignment using a different HDR technique on the image(s) received from the secondary camera, where the different HDR technique approximates the tone range produced by the HDR technique used on the image(s) output by the primary camera. In this way, the camera processor may calculate a depth map using two HDR images that are synchronized in in FOV, resolution, and tone, thus improving the accuracy of the depth map. The more accurate depth map may then improve the quality of any image effects based on image segmentation, such as depth-of-field effects, including a bokeh effect, that are applied to images using the calculated depth map.

FIG. 1 is a block diagram of a computing device 10 configured to perform one or more of the example techniques described in this disclosure for calculating a depth map from HDR images and for applying image effects to HDR images based on the calculated depth map. Examples of computing device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), an Internet telephone, a digital camera, a digital video recorder, a handheld device, such as a portable video game device or a personal digital assistant (PDA), a drone device, or any device that may include one or more cameras. In some examples, computing device 10 may include one or more camera processor(s) 14, a central processing unit (CPU) 16, a video encoder/decoder 17, a graphics processing unit (GPU) 18, local memory 20 of GPU 18, user interface 22, memory controller 24 that provides access to system memory 30, and display interface 26 that outputs signals that cause graphical data to be displayed on display 28.

As illustrated in the example of FIG. 1, computing device 10 includes one or more image sensor(s) 12A-N. Image sensor(s) 12A-N may be referred to in some instances herein simply as "sensor 12," while in other instances may be referred to as a plurality of "sensors 12" where appropriate. Sensors 12 may be any type of image sensor, including sensors that include a Bayer filter, or high-dynamic range (HDR) interlaced sensors, such as a Quad-Bayer sensor.

Computing device 10 further includes one or more lens(es) 13A-N. Similarly, lens(es) 13A-N may be referred to in some instances herein simply as "lens 13," while in other instances may be referred to as a plurality of "lenses 13" where appropriate. In some examples, sensor(s) 12 represent one or more image sensors 12 that may each include processing circuitry, an array of pixel sensors (e.g., pixels) for capturing representations of light, memory, such as buffer memory or on-chip sensor memory, etc. In some examples each of image sensors 12 may be coupled with a different type of lens 13, each lens and image sensor combination having different apertures and/or fields-of-view. Example lenses may include a telephoto lens, a wide angle lens, an ultra-wide angle lens, or other lens types.

As shown in FIG. 1, computing device 10 includes multiple cameras 15. As used herein, the term "camera" refers to a particular image sensor 12 of computing device 10, or a plurality of image sensors 12 of computing device 10, where the image sensor(s) 12 are arranged in combination with one or more lens(es) 13 of computing device 10. That is, a first camera 15 of computing device 10 refers to a first collective device that includes one or more image sensor(s) 12 and one or more lens(es) 13, and a second camera 15, separate from the first camera 15, refers to a second collective device that includes one or more image sensor(s) 12 and one or more lens(es) 13. In addition, image data may be received from image sensor(s) 12 of a particular camera 15 by camera processor(s) 14 or CPU 16. That is, camera processor(s) 14 or CPU 16 may, in some examples, receive a first set of frames of image data from a first image sensor 12 of a first camera 15 and receive a second set of frames of image data from a second image sensor 12 of a second camera 15.

In an example, the term "camera" as used herein refers to a combined image sensor 12 and lens 13 that, coupled together, are configured to capture at least one frame of image data and transfer the at least one frame of the image data to camera processor(s) 14 and/or CPU 16. In an illustrative example, a first camera 15 is configured to transfer a first frame of image data to camera processor(s) 14 and a second camera 15 is configured to transfer a second frame of image data to camera processor(s) 14, where the two frames are captured by different cameras as may be evidenced, for example, by the difference in FOV and/or zoom level of the first frame and the second frame. The difference in FOV and/or zoom level may correspond to a difference in focal length between the first camera 15 and the second camera 15.

Computing device 10 may include dual lens devices, triple lens devices, 360-degree camera lens devices, etc. As such, each lens 13 and image sensor 12 combination may provide various zoom levels, angles of view (AOV), focal lengths, fields of view (FOV), etc. In some examples, particular image sensors 12 may be allocated for each lens 13, and vice versa. For example, multiple image sensors 12 may be each allocated to different lens types (e.g., wide lens, ultra-wide lens, telephoto lens, and/or periscope lens, etc.).

Camera processor(s) 14 may be configured to control the operation of cameras 15 and perform processing on images received from cameras 15. In some examples, camera processor(s) 14 may include an image signal processor (ISP) 23. For instance, camera processor(s) 14 may include circuitry to process image data. Camera processor(s) 14, including ISP 23, may be configured to perform various operations on image data captured by image sensors 12, including auto white balance, color correction, or other post-processing operations. FIG. 1 shows a single ISP 23 configured to operate on the output of cameras 15. In other examples, camera processor(s) 14 may include an ISP 23 for each of cameras 15 in order to increase processing speed and/or improve synchronization for simultaneous image capture from multiple cameras of cameras 15.

In some examples, camera processor(s) 14 may execute "3A" algorithms. Such algorithms may include autofocus (AF), auto exposure control (AEC), and auto white balance (AWB) techniques. In such examples, 3A may represent the functionality of a statistics algorithm processing engine, where one of camera processor(s) 14 may implement and operate such a processing engine.

In some examples, camera processor(s) 14 are configured to receive image frames (e.g., pixel data) from image sensor(s) 12, and process the image frames to generate image and/or video content. For example, image sensor(s) 12 may be configured to capture individual frames, frame bursts, frame sequences for generating video content, photo stills captured while recording video, preview frames, or motion photos from before and/or after capture of a still photograph. CPU 16, GPU 18, camera processor(s) 14, or some other circuitry may be configured to process the image and/or video content captured by sensor(s) 12 into images or video for display on display 28. Image frames may generally refer to frames of data for a still image or frames of video data or combinations thereof, such as with motion photos. Camera processor(s) 14 may receive from sensor(s) 12 pixel data of the image frames in any format. For example, the pixel data may include different color formats, such as RGB, YCbCr, YUV, etc. In any case, camera processor(s) 14 may receive, from image sensor(s) 12, a plurality of frames of image data.

In examples including multiple camera processor(s) 14, camera processor(s) 14 may share sensor(s) 12, where each of camera processor(s) 14 may interface with each of sensor(s) 12. In any event, camera processor(s) 14 may initiate capture of a video or image of a scene using a plurality of pixel sensors of sensor(s) 12. In some examples, a video may include a sequence of individual frames. As such, camera processor(s) 14 causes sensor(s) 12 to capture the image using the plurality of pixel sensors. Sensor(s) 12 may then output pixel information to camera processor(s) 14 (e.g., pixel values, luma values, color values, charge values, Analog-to-Digital Units (ADU) values, etc.), the pixel information representing the captured image or sequence of captured images. In some examples, camera processor(s) 14 may process monochrome and/or color images to obtain an enhanced color image of a scene. In some examples, camera processor(s) 14 may determine universal blending weight coefficient(s) for different types of pixel blending or may determine different blending weight coefficient(s) for blending different types of pixels that make up a frame of pixels (e.g., a first blending weight coefficient for blending pixels obtained via a monochrome sensor of first camera 15 and pixels obtained via a monochrome sensor of second camera 15, a second blending weight coefficient for blending pixels obtained via a Bayer sensor of first camera 15 and pixels obtained via a Bayer sensor of second camera 15, etc.).

In an example of the disclosure, camera processor(s) 14 may cause a particular image sensor of image sensors 12 to generate an image in an HDR mode. In one example, camera processor(s) 14 may cause an image sensor 12 to generate a plurality of images at different exposure settings. In one example, camera processor(s) 14 may be configured to cause an image sensor 12 to generate multiple images and different shutter speeds, but the same aperture size. Image senor 12 may output the plurality of images at a particular field-of-view (FOV), e.g., based on a zoom setting and the type of lens selected (e.g., telephoto, wide, ultra-wide, etc.), and at a particular resolution. ISP 23 may receive the plurality of images and may, in addition to any 3A or other processing, perform a multi-frame HDR processing technique to combine the multiple images into an HDR image.

In some examples, e.g., as instructed by a user selection, camera processor(s) 14 may also perform an image-segmentation based image effect on the HDR image, such as a bokeh effect. A bokeh effect may be defined as the effect of a soft out-of-focus background that is achieved when photographing a subject in the foreground (e.g., a portrait). In digital single lens reflex (DSLR) cameras, different bokeh effects may be achieved by using different lenses with different fields-of-view and lens geometries. Bokeh effects are often aesthetically pleasing for portraits when using a telephoto lens at approximately 2× zoom.

A bokeh effect can also be achieved by camera processor(s) 14 by applying post-processing that use depth maps. For example, camera processor(s) may instruct cameras 15 to use two of image sensors 12 to generate two images the same time. Because these two image sensors 12 of cameras 15 are separated by a physical distance, the depth (e.g., distance from an images sensor 12) of features of a first image from a first image sensor 12A (e.g., the primary or "master" image sensor) of the two images can be calculated based on a comparison to those features in a second image generated by a second image sensor 12B (e.g., the secondary or "slave" image sensor). Camera processor(s) 14 may then apply a bokeh effect on the HDR image produced from the first image sensor 12A by using the calculated depth map to blur features in the image. For example, camera processor(s) 14 may keep in focus features at a depth that matches the focus distance of the generated image, while camera processor(s) 14 may blur features that are farther away from the focus distance. In some examples, the farther away a pixel is from the focal distance, the more blur that camera processor(s) 14 may apply with the bokeh effect.

In some example techniques, when applying an image effect based on image segmentation to an HDR image, an imaging device, may be configured to capture an HDR image with a primary camera (e.g., master camera) and capture another, non-HDR image with a secondary camera (e.g., a slave camera). The non-HDR image, together with the HDR image, is used to calculate the depth map for use in the image effect. However, the non-HDR image may be under exposed or over exposed because the secondary camera is capturing the same HDR scene as the primary camera. Thus, the non-HDR image captured by the secondary camera may exhibit a considerable loss of detail relative to the HDR image captured by the primary camera. As such, any depth map calculated from such an image may lack accuracy, thus affecting the quality of any image effect applied on the basis of such a depth map.

The aforementioned problems may be addressed by the HDR synchronization techniques described in this disclosure. As will be explained in greater detail below, camera processor(s) 14 may include and/or be configured to execute an HDR synchronizer 19. That is, HDR synchronizer 19 may be software executed by camera processor(s) 14, may be firmware executed by camera processor(s) 14, or may be dedicated hardware within camera processor(s) 14. FIG. 1 shows HDR synchronizer 19 as being separate from ISP 23, but in some examples HDR synchronizer 19 may be part of ISP 23.

HDR synchronizer 19 may be configured to determine the FOV and resolution of the image(s) output by a primary camera (e.g., image sensor 12A of cameras 15). Camera processor(s) 14 may process the image(s) output by the image sensor 12A produce an HDR image. HDR synchronizer 19 may instruct a different, secondary camera (e.g., image sensor 12B of cameras 15) to synchronize both the FOV and resolution of the image(s) output by the secondary camera to be the same as the FOV and resolution of the images output by the primary camera (e.g., image sensor 12A of cameras 15). Camera processor(s) 14 may also generate an HDR image from the output of the secondary camera. For example, camera processor(s) 14 (e.g., ISP 23) may also perform a tone alignment on the image(s) output by the secondary camera (e.g., image sensor 12B of cameras 15) in order to match the range of tones (e.g., range of brightness levels and/or colors) present in the HDR image produced from the images output by the primary camera (e.g., image sensor 12A of cameras 15).

In one example, camera processor(s) 14 may achieve the tone alignment by performing the same HDR process used on the image(s) received from the primary camera on the image(s) received from the secondary camera. In another example, the camera processor(s) 14 may perform the tone alignment using a different HDR technique on the image(s) received from the secondary camera, where the different HDR technique approximates the tone range produced by the HDR technique used on the image(s) output by the primary camera. In this way, camera processor(s) 14 may calculate a depth map using two HDR images that are synchronized in terms of FOV, resolution, and tone, thus improving the accuracy of the depth map. The more accurate depth map may then improve the quality of any image effects, including a bokeh effect, that is applied to images, including HDR images, using the calculated depth map.

Accordingly, as will be described in more detail below, in one example of the disclosure, camera processor(s) 14 may be configured to receive, from a first image sensor (e.g., image sensor 12A), one or more first images, wherein the one or more first images have a first field-of-view (FOV) and a first resolution. Camera processor(s) 14 may further receive, from a second image sensor (e.g., image sensor 12B), one or more second images, wherein the one or more second images have a second FOV and a second resolution. Camera processor(s) 14 may further generate a first high-dynamic range (HDR) image from the one or more first images.

Camera processor(s) 14 may perform tone alignment on the one or more second images based on the first HDR image to produce a second HDR image. In some examples, such as when the first image sensor and the second image sensor have different native FOVs (e.g., the first image sensor is a wide angle sensor and the second image sensor is an ultra-wide angle sensor), camera processor(s) 14 may further be configured to synchronize the second FOV of the one or more second images to the first FOV of the one or more first images, and cause the second image sensor to synchronize the second resolution of the one or more second images to the first resolution of the one or more first images. In this example, camera processor(s) 14 perform the tone alignment on the one or more second images after causing the synchronization of the second FOV and the synchronization of second resolution.

Camera processor(s) 14 may then generate a depth map using the first HDR image and the second HDR image, and then may apply an image effect to the first HDR image using the depth map. In one example, the image effect is a bokeh effect. Camera processor(s) 14 may also be configured to apply other images effects to the first HDR image using the calculated depth maps. Other image effects may include filters, masks, customizable emojis, green screen effects, background replacement effects, semantic understanding, 3D pose estimation and/or tracking, depth-assisted auto focus, flash metering, and/or any other image effects and/or image processing techniques that may utilize a depth map determined from an HDR image.

Although the various structures of computing device 10 are illustrated as separate in FIG. 1, the techniques of this disclosure are not so limited, and in some examples the structures may be combined to form a system on chip (SoC). As an example, camera processor(s) 14, CPU 16, GPU 18, and display interface 26 may be formed on a common integrated circuit (IC) chip. In some examples, one or more of camera processor(s) 14, CPU 16, GPU 18, and display interface 26 may be formed on separate IC chips. In addition, in some examples, HDR synchronizer 19 of camera processor(s) 14 may be part of ISP 23. Various other permutations and combinations are possible, and the techniques of this disclosure should not be considered limited to the example illustrated in FIG. 1. In an example, CPU 16 may include camera processor(s) 14 such that one or more of camera processor(s) 14 are part of CPU 16. In such examples, CPU 16 may be configured to perform one or more of the various techniques otherwise ascribed herein to camera processor(s) 14. For purposes of this disclosure, camera processor(s) 14 will be described herein as being separate and distinct from CPU 16, although this may not always be the case.

The various structures illustrated in FIG. 1 may be configured to communicate with each other using bus 32. Bus 32 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different structures shown in FIG. 1 is merely exemplary, and other configurations of computing devices and/or other image processing systems with the same or different structures may be used to implement the techniques of this disclosure.

In addition, the various components illustrated in FIG. 1 (whether formed on one device or different devices), including sensor(s) 12 and camera processor(s) 14, may be formed as at least one of fixed-function or programmable circuitry, or a combination of both, such as in one or more microprocessors, application specific integrated circuits (ASICs), field programmable gate arrays (FPGAs), digital signal processors (DSPs), or other equivalent integrated or discrete logic circuitry. In addition, examples of local memory 20 include one or more volatile or non-volatile memories or storage devices, such as random-access memory (RAM), static RAM (SRAM), dynamic RAM (DRAM), erasable programmable ROM (EPROM), electrically erasable programmable ROM (EEPROM), flash memory, a magnetic data media or an optical storage media.

In some examples, memory controller 24 may facilitate the transfer of data going into and out of system memory 30. For example, memory controller 24 may receive memory read and write commands, and service such commands with respect to memory 30 in order to provide memory services for various components of computing device 10. In such examples, memory controller 24 may be communicatively coupled to system memory 30. Although memory controller 24 is illustrated in the example of computing device 10 of FIG. 1 as being a processing circuit that is separate from both CPU 16 and system memory 30, in some examples, some or all of the functionality of memory controller 24 may be implemented on one or more of CPU 16, system memory 30, camera processor(s) 14, video encoder/decoder 17, and/or GPU 18.

System memory 30 may store program modules and/or instructions and/or data that are accessible by camera processor(s) 14, CPU 16, and/or GPU 18. For example, system memory 30 may store user applications (e.g., instructions for a camera application), resulting images from camera processor(s) 14, etc. System memory 30 may additionally store information for use by and/or generated by other components of computing device 10. For example, system memory 30 may act as a device memory for camera processor(s) 14. System memory 30 may include one or more volatile or non-volatile memories or storage devices, such as, for example, RAM, SRAM, DRAM, ROM, EPROM, EEPROM, flash memory, a magnetic data media or an optical storage media. In addition, system memory 30 may store image data (e.g., frames of video data, encoded video data, sensor-mode settings, zoom settings, 3A parameters, etc.). In some examples, system memory 30 or local memory 20 may store the image data to on-chip memory, such as in a memory buffer of system memory 30 or local memory 20. In another example, system memory 30 or local memory 20 may output image data in order to be stored external from the memory of a chip or buffer, such as to a secure digital (SD™) card of a camera device or in some instances, to another internal storage of a camera device. In an illustrative example, system memory 30 or local memory 20 may be embodied as buffer memory on a camera processor(s) 14 chip, GPU 18 chip, or both where a single chip includes both processing circuitries.

In some examples, system memory 30 may include instructions that cause camera processor(s) 14, CPU 16, GPU 18, and/or display interface 26 to perform the functions ascribed to these components in this disclosure. Accordingly, system memory 30 may be a computer-readable storage medium having instructions stored thereon that, when executed, cause one or more processors (e.g., camera processor(s) 14, CPU 16, GPU 18, and display interface 26) to perform the various techniques of this disclosure.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

In addition, camera processor(s) 14, CPU 16, and GPU 18 may store image data, user interface data, etc., in respective buffers that are allocated within system memory 30. Display interface 26 may retrieve the data from system memory 30 and configure display 28 to display the image represented by the image data, such as via a user interface 22 screen. In some examples, display interface 26 may include a digital-to-analog converter (DAC) that is configured to convert digital values retrieved from system memory 30 into an analog signal consumable by display 28. In other examples, display interface 26 may pass the digital values directly to display 28 for processing.

Computing device 10 may include a video encoder and/or video decoder 17, either of which may be integrated as part of a combined video encoder/decoder (CODEC) (e.g., a video coder). Video encoder/decoder 17 may include a video coder that encodes video captured by one or more camera(s) 15 or a decoder that can decode compressed or encoded video data. In some instances, CPU 16 and/or camera processor(s) 14 may be configured to encode and/or decode video data, in which case, CPU 16 and/or camera processor(s) 14 may include video encoder/decoder 17.

CPU 16 may comprise a general-purpose or a special-purpose processor that controls operation of computing device 10. A user may provide input to computing device 10 to cause CPU 16 to execute one or more software applications. The software applications that execute on CPU 16 may include, for example, a camera application, a graphics editing application, a media player application, a video game application, a graphical user interface application or another program. For example, a camera application may allow the user to control various settings of camera 15. The user may provide input to computing device 10 via one or more input devices (not shown) such as a keyboard, a mouse, a microphone, a touch pad or another input device that is coupled to computing device 10 via user interface 22.

One example software application is a camera application. CPU 16 executes the camera application, and in response, the camera application causes CPU 16 to generate content that display 28 outputs. For instance, display 28 may output information such as light intensity, whether flash is enabled, and other such information. The camera application may also cause CPU 16 to instruct camera processor(s) 14 to process the images output by sensor 12 in a user-defined manner. The user of computing device 10 may interface with display 28 (e.g., via user interface 22) to configure the manner in which the images are generated (e.g., with zoom settings applied, with or without flash, focus settings, exposure settings, video or still images, and other parameters). For example, CPU 16 may receive via user interface 22 an instruction to capture images in an HDR mode (e.g., capture and generate an HDR image) and/or to apply a depth-of-field effect, such as a bokeh effect (e.g., in a so-called "portrait" mode). The portrait mode may further include a bokeh setting that indicates an amount of blurring to apply.

Display 28 may include a monitor, a television, a projection device, an HDR display, a liquid crystal display (LCD), a plasma display panel, a light emitting diode (LED) array, an organic LED (OLED), electronic paper, a surface-conduction electron-emitted display (SED), a laser television display, a nanocrystal display or another type of display unit. Display 28 may be integrated within computing device 10. For instance, display 28 may be a screen of a mobile telephone handset, a tablet computer, or a laptop. Alternatively, display 28 may be a stand-alone device coupled to computing device 10 via a wired or wireless communications link. For instance, display 28 may be a computer monitor or flat panel display connected to a personal computer via a cable or wireless link. Display 28 may provide preview frames that a user may view to see what is being stored or what a picture might look like if camera 15 were to actually take a picture or start recording video.

In some examples, camera processor(s) 14 may output a flow of frames to memory controller 24 in order for the output frames to be stored as a video file. In some examples, CPU 16, video encoder/decoder 17, and/or camera processor(s) 14 may output an HDR image (e.g., with or without a bokeh effect) to be stored as a video file. In some examples, memory controller 24 may generate and/or store the output frames in any suitable video file format. In some examples, video encoder/decoder 17 may encode the output frames prior to CPU 16, video encoder/decoder 17, and/or camera processor(s) 14 causing the output frames to be stored as an encoded video. Encoder/decoder 17 may encode frames of image data using various encoding techniques, including those described in standards defined by MPEG-2, MPEG-4, ITU-T H.263, ITU-T H.264/MPEG-4, Part 10, Advanced Video Coding (AVC), ITU-T H.265/High Efficiency Video Coding (HEVC), Versatile Video Coding (VCC), etc., and extensions thereof. In a non-limiting example, CPU 16, video encoder/decoder 17, and/or camera processor(s) 14 may cause the output frames to be stored using a Moving Picture Experts Group (MPEG) video file format.

Figure 2:
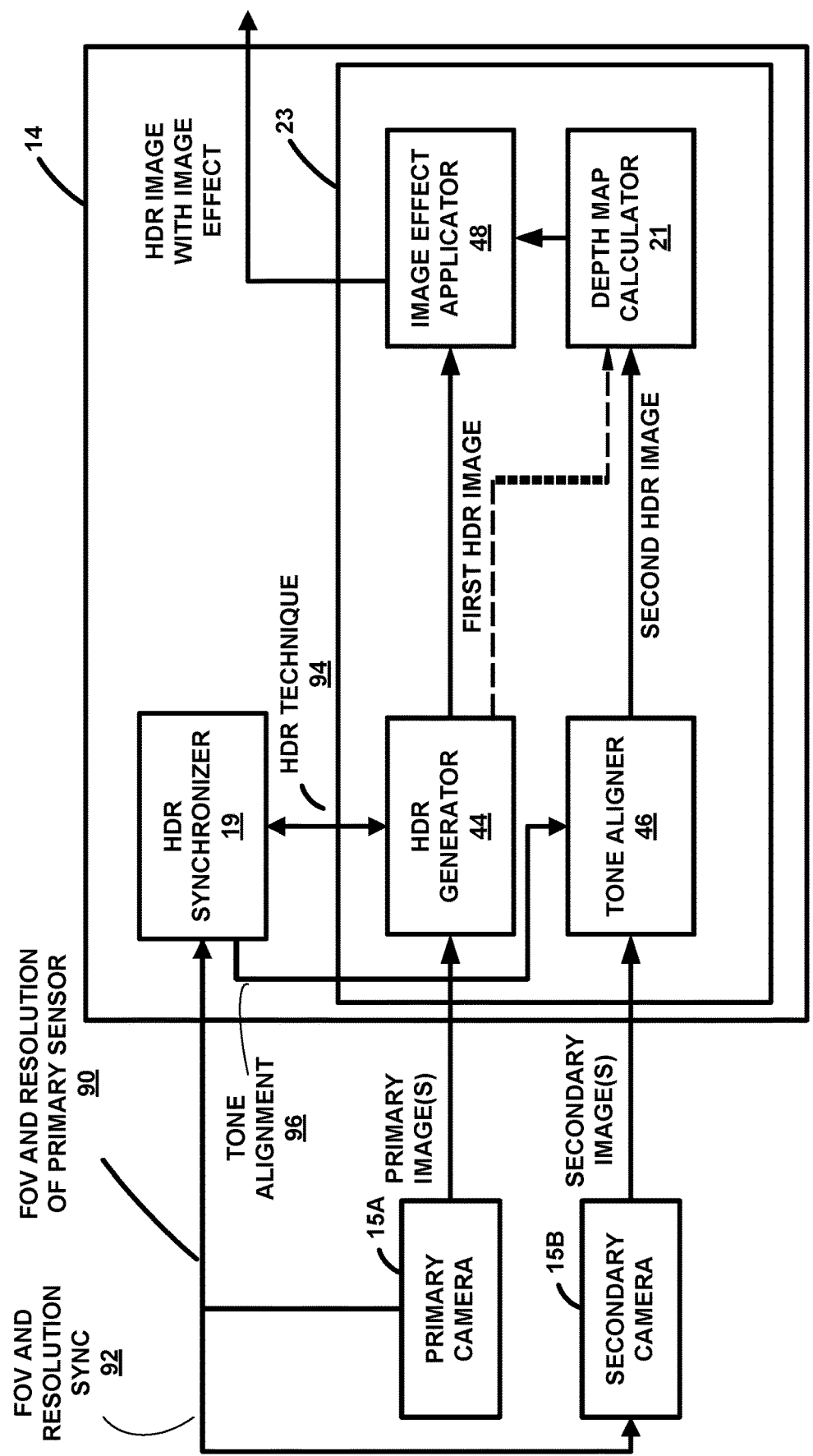
FIG. 2 is a block diagram illustrating example components of the computing device of FIG. 1 in greater detail.

FIG. 2 is a block diagram illustrating example components of the computing device of FIG. 1 in greater detail. As shown in FIG. 2, primary camera 15A (e.g., including image sensor 12A) may be instructed by camera processor(s) 14 to output one or more images for the production of an HDR image. Secondary camera 15B (e.g., including image sensor 12B) may be instructed by camera processor(s) 14 to output one or more images that may be used to calculate a depth map that may be used to apply one or more image effects based on image segmentation (e.g., a bokeh effect) to an HDR image produced from the output of primary camera 15A.

In the example of FIG. 2, ISP 23 of camera processor(s) 14 includes HDR generator 44, tone aligner 46, depth map calculator 21, and image effect applicator 48. Each of HDR generator 44, tone aligner 46, depth map calculator 21, and image effect applicator 48 may be implemented as software, firmware, hardware, or any combination thereof. Primary camera 15A may output one or more primary image(s) to HDR generator 44. HDR generator 44 may use the one or more primary images to create a first HDR image. In one example, the one or more primary images are multiple images, each captured with different exposure settings. HDR generator 44 may be configured to blend the multiple images together such that large range of brightness values are present in the blended image (i.e., the image has a high dynamic range).

For example, camera processor(s) 14 may execute an auto exposure algorithm that determines two or more different exposure settings for image sensor 12. For a three image example, camera processor(s) 14 may determine a short exposure that preserves details in high brightness areas of a scene, may determine a long exposure that boosts details in dark areas of a scene, and may determine a mid-length exposure that maintains a more accurate brightness level of mid tones in the scene. Camera processor(s) 14 may fuse the images produced from the three different exposures to produce an HDR image.

The above-techniques for HDR generation may be referred to as multi-frame HDR (MFHDR). HDR generator 44 may perform MFHDR on the primary images output by primary camera 15A using either software or hardware techniques. MFHDR is not the only technique that HDR generator 44 may use to generate HDR images. HDR techniques may include both multi-frame HDR and single-frame HDR.

Multi-frame HDR generally uses a combination of a sequence of images taken at different exposures. In some examples, such as MFHDR described above, the HDR technique may be applied as post-processing by camera processor(s) 14 (e.g., ISP 23). In other examples, HDR techniques may be applied "on-sensor." That is, primary camera 15A may be able to perform processing, such that the image output by primary camera 15A is already an HDR image. One example of such processing is called 3-exposure HDR. In 3-exposure HDR, primary camera 15A may output one image that includes pixels captured at short, mid, and long length exposure setting, and then separate that image into three images (e.g., a short exposure image, a mid-length exposure image, and long exposure image). Primary camera 15A may then blend the three resulting images together before sending to camera processor(s) 14.

In other examples, HDR generator 44 may generate an HDR image (e.g., a first HDR image) using a single frame output from primary camera 15A. Single-frame HDR may use histogram equalization post-processing of a single image, a technique sometimes referred to as local tone mapping (LTM)." In other examples, HDR generator 44 may generate an HDR image from the output of primary camera 15A using adaptive dynamic range coding (ADRC). When performing ADRC, camera processor(s) 14 may preserve high brightness areas of an image by capturing the image with a lower sensor exposure. Camera processor(s) may then apply a digital gain to the output image to compensate for overall brightness.

Another example technique for generating HDR images is staggered HDR. In staggered HDR, camera processor(s) 14 may be configured to cause a camera 15 to capture multiple images using multiple rolling shutters. A rolling shutter does not generate an image from an entire scene at one time instance, but rather generates an image by scanning either rows or columns of an image sensor 12. For example, camera 15 may combine a long period rolling shutter capture with a short period rolling shutter capture. Camera 15 may row interleave the output of the two rolling shutters.

In accordance with the techniques of this disclosure, HDR synchronizer 19 may be configured to determine the resolution of images output by primary camera 15A, may determine the field-of-view (FOV) of the images output by camera 15A, and may determine the HDR technique used by HDR generator 44 and/or primary camera 15A (e.g., for "on-sensor" HDR) in generating the first HDR image. That is, HDR synchronizer 19 may determine the FOV and resolution of primary sensor 90 of primary camera 15A and HDR technique 94 of HDR generator 44. Based on this information (i.e., FOV and resolution of primary sensor 90 and HDR technique 94), HDR synchronizer 19 will send FOV and resolution sync 92 to secondary camera 15B and tone alignment 96 to tone aligner 46.

FOV and resolution sync 92 includes instructions that cause secondary camera 15B to output secondary image(s) at the same FOV as primary camera 15A and at the same FOV as secondary camera 15B. For example, primary camera 15A may include a so-called "wide angle" camera lens. For use with a bokeh effect, camera processor(s) 14 may instruct primary camera 15A to output an FOV that is equivalent to a camera with a telephoto lens. In general, a telephoto lens on a mobile device is approximately 2× the zoom level of a wide angle lens. For example, if primary camera 15A is a wide angle lens, camera processor(s) 14 may instruct primary camera 15A to output one-quarter of the full FOV of the wide angle lens. This is because one-quarter of the full FOV of a wide angle lens may be equivalent to a full FOV of a telephoto lens. However, any size FOV may be used.

In this example, secondary camera 15B may be a camera that outputs a different FOV than primary camera 15A. Many mobiles device now include two, three, four, or more camera, each capable of outputting images at different FOVs. In one example, secondary camera 15B may include a so-called "ultra-wide angle" camera lens that has a smaller zoom and larger FOV than a wide angle lens. Preferably, primary camera 15A and secondary camera 15B are physically positioned in the same vertical or horizontal plane on computing device 10 (e.g., are co-planar), and not in any diagonal physical orientations. While possible, images from two cameras positioned diagonally from each other makes calculation of depth values from such cameras difficult.

In some example mobile devices, the cameras with ultra-wide and wide angle lenses are co-planar (e.g., on the same vertical or horizontal plane), while a camera with a telephoto lens is located diagonally from both the ultra-wide and wide angle lenses. In such devices, it would be preferable to use the two co-planar camera sensors as primary camera 15A and secondary camera 15B when calculating depth values for a depth-of-filed effect, such as a bokeh effect. For example, if primary camera 15A has a wide angle lens and is outputting an FOV that is one-quarter the size of its full FOV, and secondary camera 15A has an ultra-wide angle lens, HDR synchronizer 19 may send FOV and resolution sync 92 to secondary camera 15B that instructs secondary camera 15B to output an FOV that matches the one-quarter FOV of primary camera 15A.

For some example ultra-wide angle lenses, the output FOV of secondary camera 15B may be one-sixteenth the full FOV of secondary camera 15B. In general, primary camera 15A and secondary camera 15B may be any two types of cameras. The two cameras may be capable of outputting the same full FOV (e.g., the maximum FOV of the camera) or may be two cameras capable of outputting different full FOVs. Regardless of the FOVs that are capable of being output by primary camera 15A and secondary camera 15B, HDR synchronizer 19 sends FOV resolution sync 92 to secondary camera 15B such that the output FOV of the secondary image(s) is the same as the FOV of the primary image(s) output by primary camera 15A. In other examples, rather instructing secondary camera 15B to perform an FOV sync, camera processor(s) 14 will receive the full FOV of secondary camera 15B and perform any FOV synchronization at ISP 23, CPU 16, or another processing unit of computing device 10.

As mentioned above, FOV and resolution sync 92 may further include instructions that cause secondary camera 15B to output image(s) and output secondary image(s) at the same resolution as primary camera 15A. In this context, resolution refers to the number of pixels that are output in the image. Resolutions are generally measured for the full FOV of a camera, and may be smaller if the output FOV of a camera is less than the full FOV. Primary camera 15A and secondary camera 15A may include image sensors that are capable of outputting images at multiple different resolutions. In general, HDR synchronizer 19 may determine the output resolution of primary camera 15A and include instructions in FOV and resolution sync 92 that cause secondary camera 15B to output images at the same resolution as primary camera 15A.

As one example, primary camera 15A may include a Quad-Bayer color filter array (QCFA) sensor that is capable of outputting images at 48 MP (or any other resolution) in a remosaicing mode, and outputting images at 12 MP (e.g., a four times reduction of the maximum resolution) in a binning mode. In other examples, other levels of binning may be used. In general, in a binning mode, a sensor averages adjacent pixels (e.g., 2 or 4 adjacent pixels) having the same color filter to provide a higher signal-to-noise ratio for lower light image capture. More detail regarding binning and remosaicing will be described below.

For the example of a QCFA sensor, HDR synchronizer 19 may determine whether primary camera 15A is outputting images using the remosaicing resolution mode or the binning resolution mode (e.g., in FOV and resolution of primary sensor 90). Based on the determination, HDR synchronizer 19 will include instruction in FOV and resolution sync 92 that cause secondary camera 15B to output images using the same resolution mode. In some examples, if the FOV on primary camera 15A or secondary camera 15B is a smaller portion of the full FOV (e.g., for a wide lens or an ultra-wide lens), primary camera 15A and/or secondary camera 15B may upscale the output image so that the same number of pixels are present in both the output of primary camera 15A and secondary camera 15B.

The result of FOV and resolution sync 92 is that secondary camera 15B outputs images with an FOV and resolution that matches the output of primary camera 15A. In this way, the secondary image(s) output by secondary camera 15B more closely match the primary image(s) output by primary camera 15A. As such, corresponding pixels in each of the primary image(s) and secondary image(s) are likely to show the same features in the output images, thus making depth map calculator 21 determinations of depth values for the features represented by in those pixels more accurate.

In addition, to matching the FOV and resolution of the primary image(s), HDR synchronizer 19 may also be configured to generate an HDR image from the output of secondary camera 15B. For example, HDR synchronizer 19 may be configured to match the tone of the secondary images to the tone of the first HDR image created from the primary image(s) by HDR generator 44. In general, an HDR image will include a higher range of brightness values (e.g., a higher dynamic range of brightness values) and/or a higher range of color values (e.g., a wider color gamut) relative to an image with standard or low dynamic range. In order to match the tonal range of the first HDR image for purposes of improved depth map calculation, HDR synchronizer 19 may determine the HDR technique 94 used by HDR generator 44 to generate the first HDR image, and send tone alignment 96 to tone aligner 46. Tone aligner 46 will use tone alignment 96 instructions to perform an HDR process on the secondary image(s) to produce a second HDR image, such that the second HDR image includes the same, or approximately the same tonal range of the first HDR image produced by HDR generator 44.

In some examples, tone alignment 96 may include instructions for tone aligner 46 to perform the same HDR process as HDR generator 44. For example, if HDR synchronizer 19 determines that HDR technique 94 of HDR generator 44 is hardware-based MFHDR, HDR synchronizer 19 will include instructions in tone alignment 96 that cause tone aligner 46 to also perform hardware-based MFHDR on the secondary images output by secondary camera 15B. Likewise, if HDR synchronizer 19 determines that HDR technique 94 of HDR generator 44 is ADRC, HDR synchronizer 19 will include instructions in tone alignment 96 that cause tone aligner 46 to also perform ADRC on the secondary images output by secondary camera 15B.

However, in some examples, computing device 10 may not be configured to perform the same HDR process on multiple sets of images at the same time. For example, computing device 10 may only include one processing engine in ISP 23 capable of performing MFHDR. In that case, HDR synchronizer 19 may include instructions in tone alignment 96 that cause tone aligner 46 to apply a different HDR process, such as ADRC, 3-exposure HDR, staggered HDR, Quad-Bayer Coding (QBC) HDR, or any other HDR technique. In other examples, HDR synchronizer 19 may include instructions in tone alignment 96 that are then sent to secondary camera 15B that causes secondary camera 15B to perform an "on-sensor" HDR technique, such as 3-exposure HDR.

In examples where the same HDR process that is used by HDR generator 44 is not available for use with images output by secondary camera 15B, but ISP 23 may be capable of multiple different HDR techniques for use by tone aligner 46, HDR synchronizer 19 may determine which of the available HDR processes best approximates the tonal range of HDR images produced by the process performed by HDR generator 44. HDR synchronizer 19 may then instruct tone aligner 46 to generate the second HDR image using the determined HDR technique that best approximates the tone range produced HDR generator 44.

Using the techniques of this disclosure, the second HDR image output by tone aligner 46 matches and/or closely approximates the FOV, resolution, and tone of the first HDR image. Depth map calculator may then determine the relative depth of pixels in the first HDR image by comparing the first HDR image and the second HDR image. Because the first HDR image and the second HDR image are captured from slightly different perspectives (i.e., primary camera 15A and secondary 15B are physically separated), the differences in location, orientation, and size of a feature (e.g., objects, faces, natural features, etc.) represented in the pixels in the two images for depth map calculator to calculate a depth for each pixel (e.g., a depth map). The depth map includes the distance of each pixel in an image relative to the image sensor, or the distance of each pixel in an image relative to a focal point.

Depth map calculator 21 may then send the calculated depth map to image effect applicator 48. In some examples, in addition to determining a depth map from the first HDR image and the second HDR image (e.g., from stereo HDR images) as described above, depth map calculator 21 may perform additional techniques to refine and/or determine depth values of features in the first HDR image. Other techniques for determining and/or refining depth values may include artificial intelligence (AI) segmentation assisted depth-from-stereo (DFS), time-of-flight (ToF) assisted DFS, structured light assisted DFS, and the like. For example, depth map calculator may use a ToF laser to measure the distance to features in the first HDR image. Depth map calculator 21 may use this distance to fine-time the depth map generated from the first HDR image and the second HDR image.

Image effect applicator 48 may use the depth map to apply a depth-of-field effect, such as a bokeh effect, to the first HDR image produced from the output of primary camera 15A. For example, when applying a bokeh effect, image effect applicator 48 may use the calculated depth map to progressively blur pixels in the first HDR image. For example, image effect applicator 48 may keep pixels in focus (e.g., apply no blurring) that are at a depth that matches the focus distance of the primary image(s), while image effect applicator 48 may progressively blur pixels that are farther away from the focus distance. The farther away a pixel is from the focal distance, the more blur that image effect applicator 48 may apply to achieve the bokeh effect.

Figure 3:
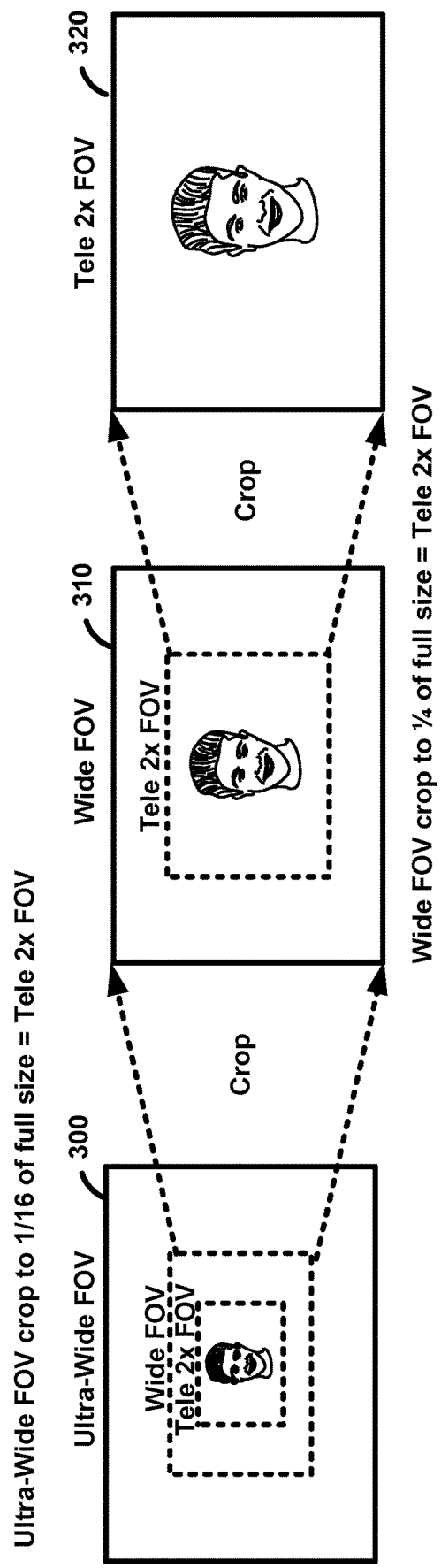
FIG. 3 is a conceptual diagram illustrating an example of field-of-view synchronization.

FIG. 3 is a conceptual diagram illustrating an example of FOV synchronization for different lens types. As shown in FIG. 3, an image 320 that is captured using a camera having a telephoto lens is, in some examples, approximately 2× the zoom of the FOV (e.g., Tele 2×FOV) from an image 310 that is captured using a camera having a wide angle lens (e.g., a wide FOV). That is, in this example, the wide angle lens and wide FOV may be considered as being at 1× zoom, while the telephoto lens and telephoto FOV may be considered as being at 2× zoom. As such, the output FOV, as indicated by the dashed lines, from image 310 would be one-quarter of the full wide FOV of image 310 if the FOV of image 310 were to match the full FOV (e.g., Tele 2× FOV) of image 320. As mentioned above, in some examples, bokeh effects are most aesthetically pleasing when captured with the FOV of a telephoto lens. As shown in FIG. 3, a camera (e.g., primary camera 15A of FIG. 2) may crop the wide FOV of image 310 to produce an output FOV that is equal to the full FOV of a 2× zoom telephone lens.

For a camera (e.g., secondary camera 15B of FIG. 2) having an ultra-wide lens (e.g., producing an ultra-wide FOV), to output the same FOV as the telephoto 2×FOV, a camera would crop image 300 such that one-sixteenth of the full FOV of image 300 is output. That is, in some examples, one-sixteenth of the FOV of an ultra-wide camera is the same as the FOV of a telephoto lens at 2× zoom. Relative to a full wide FOV, the output FOV of an ultra-wide lens that matches the full FOV of image 310 would be one-quarter the size of image 300.

Figure 4:
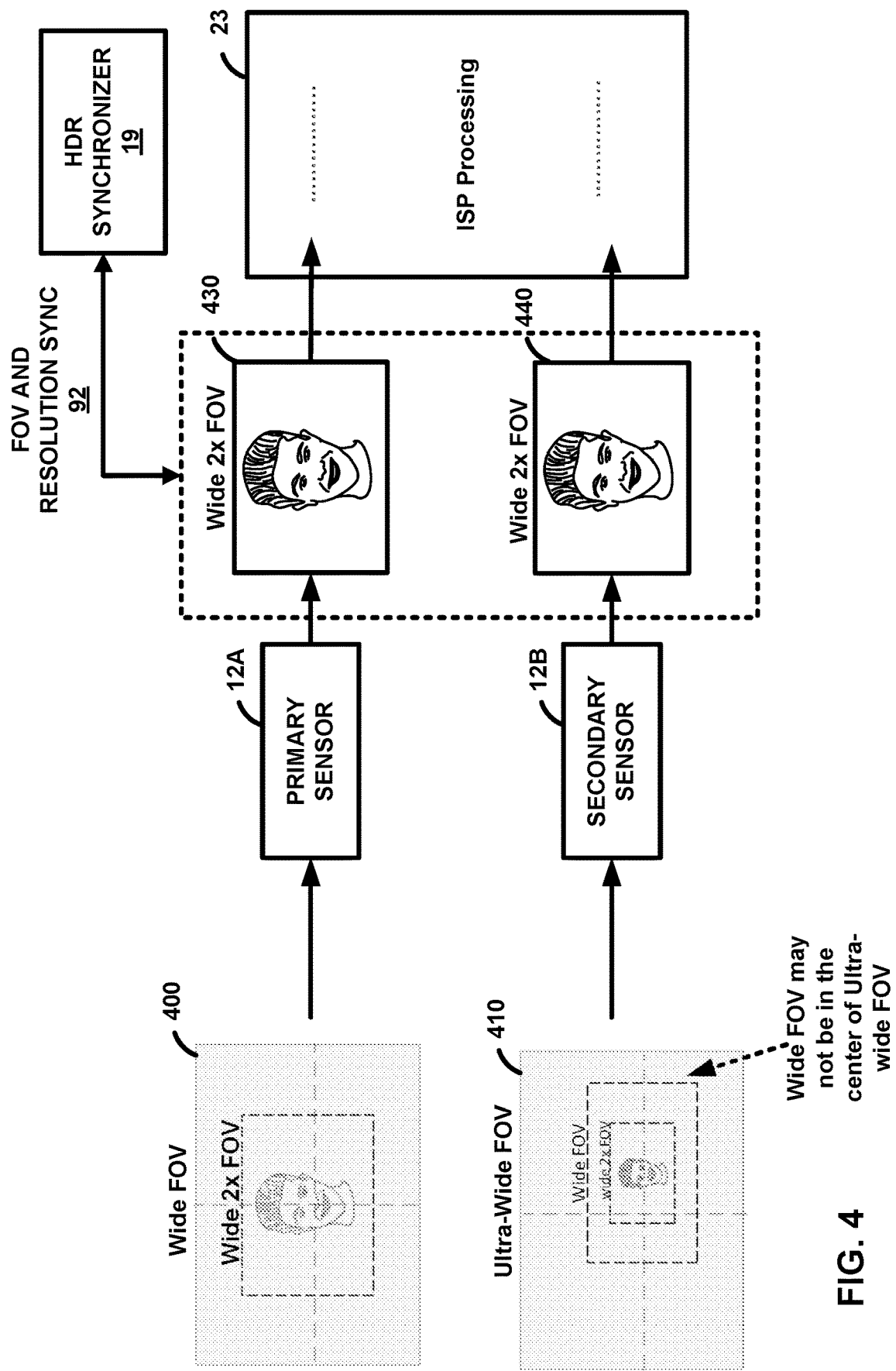
FIG. 4 is a block diagram illustrating an example field-of-view synchronization technique using wide angle and ultra-wide angle fields-of-view.

FIG. 4 is a block diagram illustrating an example field-of-view synchronization technique using wide angle and ultra-wide angle FOVs. As shown in FIG. 4, primary sensor 12A is part of a camera that includes a wide angle lens capable of capturing a wide FOV 400. Secondary sensor 12B is part of a camera that includes an ultra-wide angle lens capable of capturing an ultra-wide FOV 410. Camera processor(s) 14 may be configured to instruct primary sensor 12A to output a wide 2×FOV 430. That is, camera processor(s) 14 may be configured to instruct primary sensor 12A to output an FOV that is equivalent to a telephoto lens at 2× zoom relative to the full wide FOV, e.g., when generating an image to which a bokeh effect will be applied. As shown in FIG. 4, primary sensor 12A may be configured crop the center one-quarter of full wide FOV 400 to output wide 2×FOV 430.

HDR synchronizer 19 may be configured to determine, either directly from camera processor(s) 14 or by querying primary sensor 12A, the output FOV of primary sensor 12A. Based on the output FOV of primary sensor 12A, and the sensor and lens type of secondary sensor 12B, HDR synchronizer 19 will send FOV and resolution sync 92 to secondary sensor 12B. The FOV and resolution sync 92 will include instructions that cause secondary sensor 12B to output an FOV (e.g., Wide 2×FOV 440) that matches the output Wide 2×FOV 430 of primary sensor 12A.

In the example of FIG. 4, secondary sensor 12B is part of a camera that includes an ultra-wide angle lens capable of capturing an ultra-wide FOV 410. To match the output Wide 2×FOV 430 of primary sensor 12A, FOV and resolution sync 92 may instruct secondary sensor 12B to crop ultra-wide FOV 410 such that one-sixteenth of the ultra-wide FOV 410 is output to achieve output Wide 2×FOV 440. Or more generally, FOV and resolution sync 92 may instruct secondary sensor 12B to crop ultra-wide FOV 410 such that the output FOV of secondary sensor 12B matches the output FOV of primary sensor 12A.

Primary sensor 12A and secondary sensor 12B may achieve a particular output FOV by cropping the initial image such that the output portion of the full FOV. However, to match the output FOV of primary sensor 12A, secondary sensor 12B may not necessarily crop to the center of full ultra-wide FOV 410. In some examples, the matching wide FOV in ultra-wide FOV 410 may not be in the center. As such, in some examples, FOV and resolution sync 92 may further include instructions for spatially aligning the FOV output by secondary sensor 12B.

After any cropping and spatially aligning, primary sensor 12A and secondary sensor 12B may send the images with the output FOVs to ISP 23 for ISP processing. As described above, ISP processing may include 3A stats processing, as well as HDR generator 44, tone aligner 46, depth map calculator 21, and image effect applicator 48, as shown in FIG. 2. FIG. 4 shows HDR synchronizer 19 as being separate from ISP 23. However, in some examples, HDR synchronizer 19 may be part of ISP 23.

In other examples, rather instructing primary sensor 12A and secondary sensor 12B to perform any cropping to achieve an FOV sync, camera processor(s) 14 may be configured to receive the full FOV of both primary sensor 12A and secondary sensor 12B. HDR synchronizer 19 may then cause ISP 23, CPU 16, or another processing unit of computing device 10 to perform the FOV synchronization.

Figure 5:
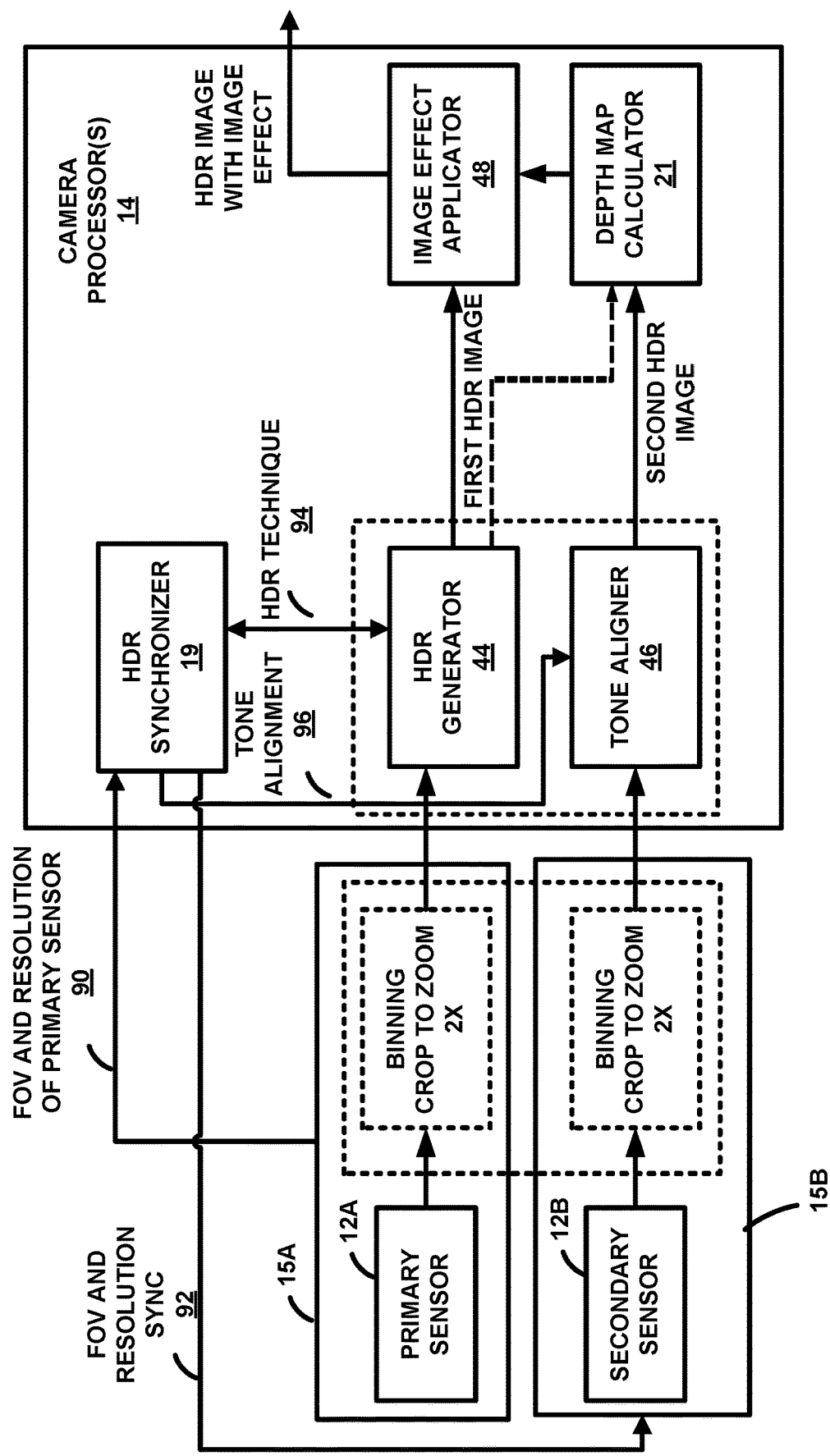
FIG. 5 illustrates an example field-of-view and resolution synchronization techniques of the disclosure.

FIG. 5 illustrates an example field-of-view and resolution synchronization techniques of the disclosure. In the example of FIG. 5, HDR synchronizer 19 determines that primary sensor 12A of primary camera 15A is configured to output an image using a binning resolution mode and is configured to crop the FOV to be zoom 2×. That is, the output FOV of primary sensor 12A is equivalent to that of a telephoto lens that is 2× zoom relative to a wide angle lens. HDR synchronizer 19 may then send FOV and resolution sync 92 to secondary sensor 12B of secondary camera 15B. FOV and resolution sync 92 includes instructions that cause secondary sensor 12B to output images using the binning resolution mode and causes secondary sensor to crop the image to the FOV equivalent to zoom 2×.

Figure 6:
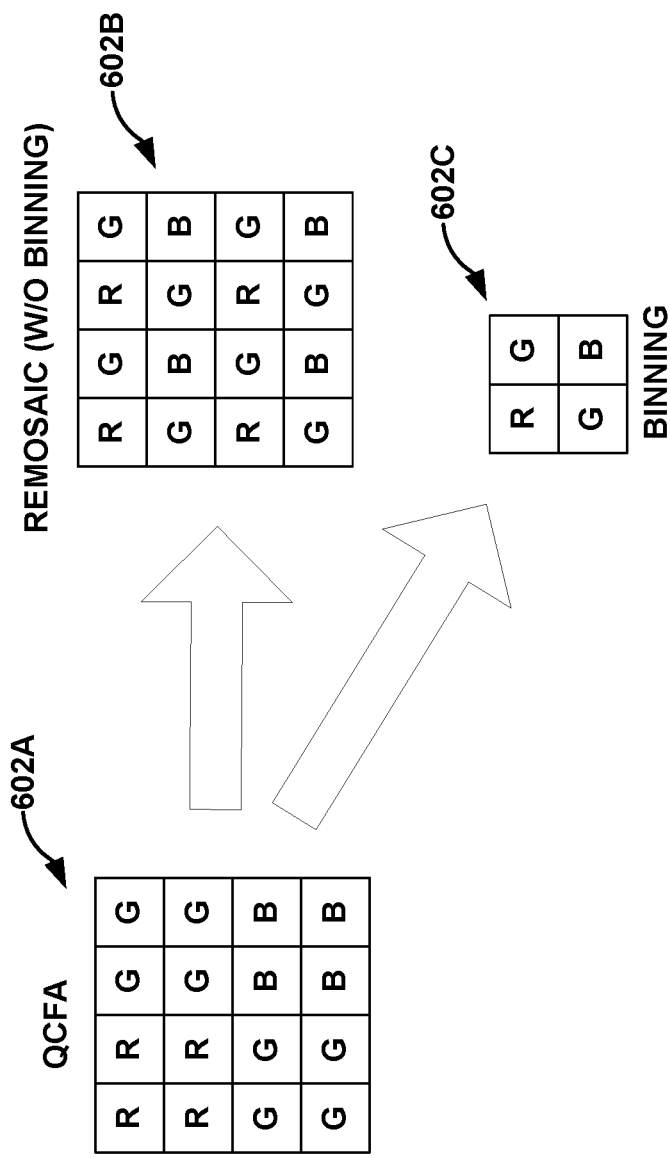
FIG. 6 illustrates example resolution synchronization techniques of the disclosure.

FIG. 6 illustrates example resolution synchronization techniques of the disclosure. FIG. 6 shows a portion of a QCFA sensor portion 602A. QCFA 602A has a Quad-Bayer mosaic pattern. In one example, each 16×16 portion of a QCFA sensor may include four adjacent red color filters, four adjacent blue color filters, and two sets of four adjacent green color filters. Combined together, such a pattern may represent a wide range of colors. More green color filters are used because the human eye is more sensitive to green.

A QCFA sensor that includes four adjacent color pixels because a QCFA sensor is configured for binning mode. In binning mode, adjacent color pixels are averaged together to form a single output pixels. Averaging the values of four adjacent color pixels together increases the signal-to-noise ratio of the output, particularly for low-light scenarios, at the expense of resolution. For example, a 48 MP QCFA sensor will output images at 12 MP when using 4:1 binning. QCFA sensor portion 602C shows the output of QCFA sensor portion 602A after 4:1 binning. While the example of FIG. 6 shows 4:1 binning, the techniques of this disclosure may be used with any level of binning.

For example, in some zoom operations, camera processor(s) 14 may utilize such techniques in cases where pixel binning techniques are used that adapt to increasing or decreasing zoom levels, as described in U.S. patent application Ser. No. 16/667,662 by Liu et al., entitled "IMAGE CAPTURE MODE ADAPTATION," filed on Oct. 29, 2019. In more general cases, image sensor(s) 12 may perform pixel binning by combining multiple pixels of image sensor(s) 12 into fewer pixels for output to camera processor(s) 14 (e.g., 4×4 binning, 3×3 binning, 2×2 binning, horizontal binning, vertical binning, etc.). Binning techniques improve the signal-to-noise ratio (SNR) by allowing image sensor(s) 12, or in some instances, camera processor(s) 14, to combine pixels together through various combination schemes, including averaging or summing multiple pixels together for each output pixel.

In other examples, a QCFA sensor may be configured to output the full resolution, such as scenarios where binning is not desired (e.g., relatively high light scenarios). Because the pattern of a QCFA sensor is arranged for binning purposes, a QCFA sensor may be configured to perform a remosaicing process on the output color pixels, so as to form a traditional Bayer pattern. QCFA sensor portion 602B shows QCFA sensor portion 602A after remosaicing. As can be seen, the remosaicing process maintains the full resolution of the sensor.

In a remosaicing example, FIG. 6 shows the QCFA sensor portion 602A remosaiced into a Bayer mosaic state as QCFA sensor portion 602B. Remosaicing involves converting a first mosaic into a second mosaic. To do so, the processing system (e.g., processors of image sensor 12 and/or camera processor(s) 14) can remosaic based on a context of the first mosaic. The processing system can assign a context to the first mosaic based on one or more statistical measurements of the first mosaic such as variance and/or standard deviation. A first mosaic with complex structure (e.g., many edges) can produce a high variance and/or standard deviation, resulting in a corresponding first context. Contrarily, a first mosaic with less structure (e.g., few edges) can produce a low variance and/or standard deviation, resulting in a corresponding second context. The first mosaic can have a first spectral pattern (e.g., a Quadra pattern). The second mosaic can have a second spectral pattern (e.g., a Bayer pattern). In some examples, the second spectral pattern can be compatible with multi-channel interpolators.

In some examples, the first and second mosaics can have the same resolution (and thus the same pixels arranged in the same aspect ratio). In other examples, the second mosaic can have a different resolution than the first mosaic. In an example, the second mosaic can have a lower resolution than that of the first mosaic and thus, include some, but not all, of the pixels in the first mosaic.

In some instances, image sensor(s) 12 may output all pixels of image sensor(s) 12 full potential FOV (e.g., 100% of the FOV). In some instances, however, camera processor(s) 14 may cause image sensor(s) 12 to output a reduced number of pixels relative to image sensor(s) 12 full potential FOV (e.g., center 33%, center 25%, etc.). In other words, the term "output pixels" as used herein generally refers to the actual number of pixels output from image sensor(s) 12 to camera processor(s) 14 (e.g., 100%, center 25%, etc.).

Figure 7:
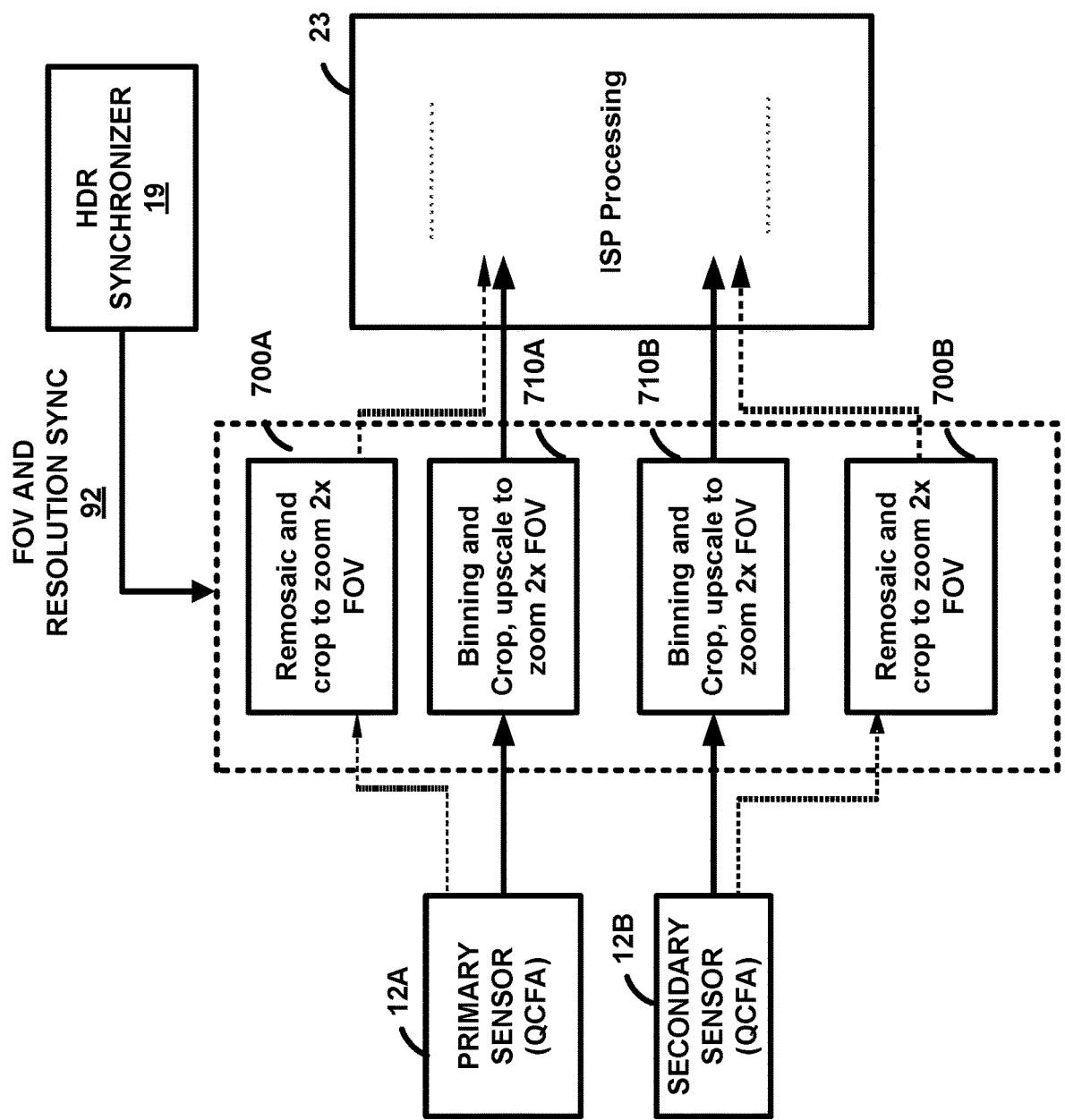
FIG. 7 illustrates another example field-of-view and resolution synchronization techniques of the disclosure for a Quad-Bayer color filter array (QCFA).

FIG. 7 illustrates another example field-of-view and resolution synchronization techniques of the disclosure for a Quad-Bayer color filter array (QCFA). In this example, both primary sensor 12A and secondary sensor 12B are QCFA sensors. As such, HDR synchronizer 19 may determine if primary sensor 12A is outputting an image in remosaicing mode 700A or in binning mode 710A. Based on the determination, HDR synchronizer 19 will instruct secondary sensor 12B to output images in either binning mode 710B or remosaicing mode 700B to match the output of primary sensor 12A. In the example of FIG. 7, both primary sensor 12A and secondary sensor 12B are configured to crop to a 2× zoom FOV. In the binning context, the sensors may also perform upscaling to match the FOV, as the sensor resolution is reduced when performing binning. However, FOVs other than 2× zoom may be used with the techniques of this disclosure.

After synchronizing the resolutions and FOVs, primary sensor 12A and secondary sensor 12B may send the images with the output FOVs and resolutions to ISP 23 for ISP processing. As described above, ISP processing may include 3A stats processing, as well as HDR generator 44, tone aligner 46, depth map calculator 21, and image effect applicator 48, as shown in FIG. 2. FIG. 7 shows HDR synchronizer 19 as being separate from ISP 23. However, in some examples, HDR synchronizer 19 may be part of ISP 23.

Figure 8:
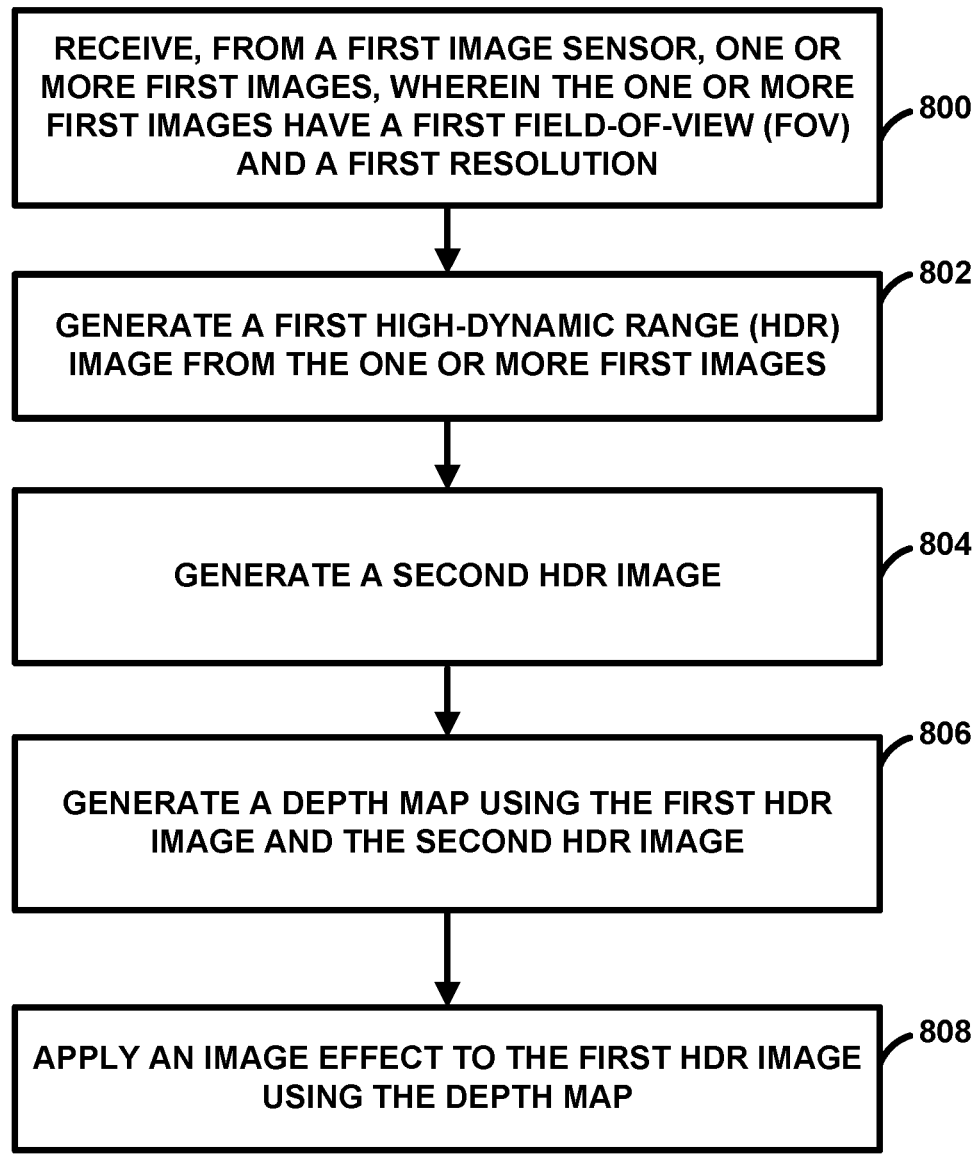
FIG. 8 is a flowchart illustrating an example operation of camera processing in accordance with example techniques of this disclosure.

FIG. 8 is a flowchart illustrating an example operation of camera processing in accordance with example techniques of this disclosure. The techniques of FIG. 8 may be performed by one or more processors, such as camera processor(s) 14 of FIG. 1. In one example of the disclosure, camera processor(s) 14 may be configured receive, from a first image sensor, one or more first images, wherein the one or more first images have a first field-of-view (FOV) and a first resolution (800). Camera processor(s) 14 may also generate a first high-dynamic range (HDR) image from the one or more first images (802).

Camera processor(s) 14 may also generate a second HDR image (804). For example, camera processor(s) 14 may be further configured to receiving, from a second image sensor, one or more second images, wherein the one or more second images have a second FOV and a second resolution. As will be explained below in reference to FIG. 9, camera processor(s) 14 may be configured to generate the second HDR image from the one or more second images. For example, camera processor(s) may synchronize the second FOV and second resolution of the one or more second images to the first FOV and the first resolution of the or more first images. In addition, camera processor(s) 14 may apply the same HDR process to the one or more second images as the process applied to the one or more first images to produce the first HDR image.

Figure 9:
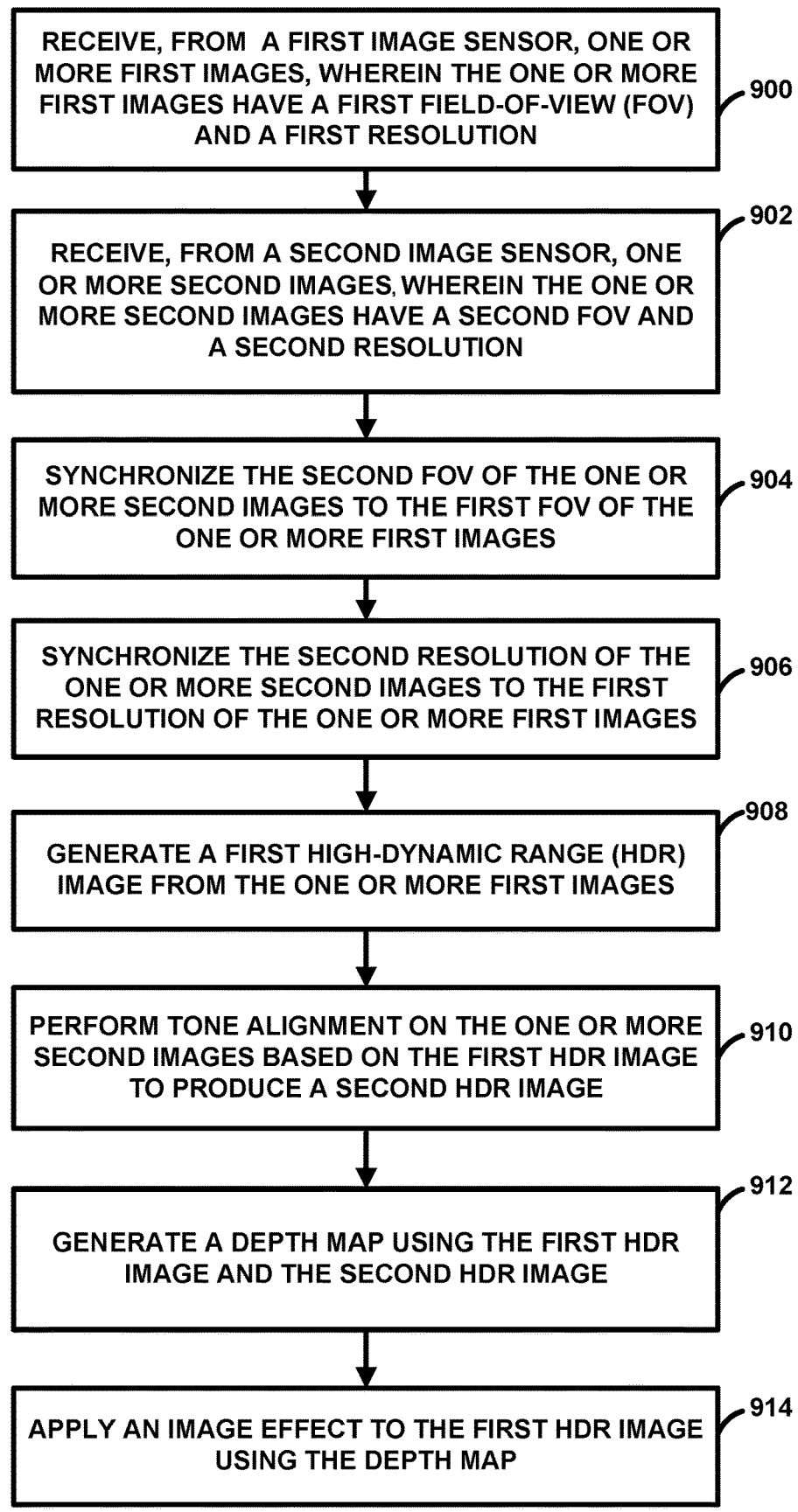
FIG. 9 is a flowchart illustrating another example operation of camera processing in accordance with example techniques of this disclosure.

Camera processor(s) 14 may then generate a depth map using the first HDR image and the second HDR image (806), and apply an image effect to the first HDR image using the depth map (808). In one example, the image effect is a bokeh effect. As explained above, in some examples, camera processor(s) 14 may also be configured to synchronize both the FOV and resolution output by the second image sensor to be the same as the FOV and resolution output by the first image sensor. FIG. 9 describes a process that includes FOV and resolution synchronization in more detail.

FIG. 9 is a flowchart illustrating another example operation of camera processing in accordance with example techniques of this disclosure. The techniques of FIG. 9 may be performed by one or more processors, such as camera processor(s) 14 of FIG. 1.

In one example of the disclosure, camera processor(s) 14 may be configured to receive, from a first image sensor, one or more first images, wherein the one or more first images have a first field-of-view (FOV) and a first resolution (900). Camera processor(s) 14 may be further configured to receive, from a second image sensor, one or more second images, wherein the one or more second images have a second FOV and a second resolution (902). Camera processor(s) 14 may be further configured to synchronize the second FOV of the one or more second images to the first FOV of the one or more first images (904), and synchronize the second resolution of the one or more second images to the first resolution of the one or more first images (906).

Camera processor(s) 14 may generate a first high-dynamic range (HDR) image from the one or more first images (908), and may perform tone alignment on the one or more second images based on the first HDR image to produce a second HDR image (910). Camera processor(s) 14 may generate a depth map using the first HDR image and the second HDR image (912), and may apply an image effect to the first HDR image using the depth map (914). In one example, the image effect is a bokeh effect.

In one example of the disclosure, to synchronize the second FOV of the one or more second images to the first FOV of the one or more first images, camera processor(s) 14 are configured to cause the second image sensor to crop the second FOV to match the first FOV. In another example, to synchronize the second FOV of the one or more second images to the first FOV of the one or more first images further, camera processor(s) 14 are further configured to cause the second image sensor to spatially align (e.g., re-center) the second FOV to match the first FOV.

In another example of the disclosure, to synchronize the second resolution of the one or more second images to the first resolution of the one or more first images, camera processor(s) 14 are further configured to cause the second image sensor to perform remosaicing on the one or more second images having the synchronized second FOV. In another example, to synchronize the second resolution of the one or more second images to the first resolution of the one or more first images, camera processor(s) 14 are further configured to cause the second image sensor to perform a binning operation on the one or more second images having the synchronized second FOV.

In another example of the disclosure, to generate the first HDR image from the one or more first images, camera processor(s) 14 are further configured to generate the first HDR image using a plurality of the one or more first images using a multi-frame HDR technique. In one example, to perform the tone alignment on the one or more second images based on the first HDR image to produce a second HDR image, camera processor(s) 14 are further configured to generate the second HDR image using a plurality of the one or more second images using the multi-frame HDR technique.

In another example, to generate the first HDR image from the one or more first images, camera processor(s) 14 are further configured to generate the first HDR image using a plurality of the one or more first images using a first HDR technique. In this example, to perform the tone alignment on the one or more second images based on the first HDR image to produce a second HDR image, camera processor(s) 14 are further configured to generate the second HDR image using a second HDR technique that approximates a tone range produced by the first HDR technique. In one example, the first HDR technique is a multi-frame HDR technique and the second HDR technique is one of a three-exposure HDR technique or an adaptive dynamic range coding (ADRC) technique.

Additional illustrative examples of the disclosure are listed below.

Example 1—An apparatus configured for camera processing, the apparatus comprising: means for receiving, from a first image sensor, one or more first images, wherein the one or more first images have a first field-of-view (FOV) and a first resolution; means for generating a first high-dynamic range (HDR) image from the one or more first images; means for generating a second high-dynamic range (HDR) image; and means for generating a depth map using the first HDR image and the second HDR image.

Example 2—The apparatus of Example 1, further comprising: means for receiving, from a second image sensor, one or more second images, wherein the one or more second images have a second FOV and a second resolution; and means for generating the second HDR image from the one or more second images.

Example 3—The apparatus of Example 2, wherein the means for generating the second HDR image from the one or more second images comprises: means for performing tone alignment on the one or more second images based on the first HDR image to produce the second HDR image.

Example 4—The apparatus of Example 2, further comprising: means for synchronizing the second FOV of the one or more second images to the first FOV of the one or more first images; and means for synchronizing the second resolution of the one or more second images to the first resolution of the one or more first images, and wherein the means for generating the second HDR image from the one or more second images occurs after the means for synchronizing the second FOV and the means for synchronizing the second resolution.

Example 5—The apparatus of Example 4, wherein the means for synchronizing the second FOV of the one or more second images to the first FOV of the one or more first images comprises: means for causing the second image sensor to crop the second FOV to match the first FOV.

Example 6—The apparatus of Example 5, wherein the means for synchronizing the second FOV of the one or more second images to the first FOV of the one or more first images further comprises: means for spatially aligning the second FOV to match the first FOV.

Example 7—The apparatus of Example 2, wherein the means for synchronizing the second resolution of the one or more second images to the first resolution of the one or more first images comprises: means for causing the second image sensor to perform remosaicing on the one or more second images having the synchronized second FOV.

Example 8—The apparatus of Example 2, wherein the means for synchronizing the second resolution of the one or more second images to the first resolution of the one or more first images comprises: means for causing the second image sensor to perform a binning operation on the one or more second images having the synchronized second FOV.

Example 9—The apparatus of Example 2, wherein the means for generating the first HDR image from the one or more first images comprises means for generating the first HDR image using a plurality of the one or more first images using a multi-frame HDR technique, and wherein the means for generating the second HDR image from the one or more second images comprises means for generating the second HDR image using a plurality of the one or more second images using the multi-frame HDR technique.

Example 10—The apparatus of Example 2, wherein the means for generating the first HDR image from the one or more first images comprises means for generating the first HDR image using a plurality of the one or more first images using a first HDR technique, and wherein the means for generating the second HDR image from the one or more second images comprises means for generating the second HDR image using a second HDR technique based on a tone range produced by the first HDR technique.

Example 11—The apparatus of Example 2, wherein the first HDR technique is a multi-frame HDR technique and wherein the second HDR technique is one of a three-exposure HDR technique or an adaptive dynamic range coding (ADRC) technique.

Example 12—The apparatus of Example 1, further comprising: means for applying an image effect to the first HDR image using the depth map.

Example 13—The apparatus of Example 12, wherein the image effect is a bokeh effect.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where discs usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units.

Various examples have been described. These and other examples are within the scope of the following claims.

What is claimed is:

1. A device configured for camera processing, the device comprising:
   a memory configured to receive images; and
   one or more processors in communication with the memory, the one or more processors configured to:
   receive, from a first image sensor, one or more first images, wherein the one or more first images have a first field-of-view (FOV) and a first resolution;
   generate a first high-dynamic range (HDR) image from the one or more first images;
   receive, from a second image sensor, one or more second images, wherein the one or more second images have a second FOV and a second resolution;
   generate a second high-dynamic range (HDR) image from the one or more second images, including performing tone alignment on the one or more second images based on the first HDR image; and
   generate a depth map using the first HDR image and the second HDR image.

2. The device of claim 1, wherein the one or more processors are further configured to:
   synchronize the second FOV of the one or more second images to the first FOV of the one or more first images; and
   synchronize the second resolution of the one or more second images to the first resolution of the one or more first images, and
   wherein the one or more processors generate the second HDR image from the one or more second images after the synchronization of the second FOV and the synchronization of the second resolution.

3. The device of claim 2, wherein to synchronize the second FOV of the one or more second images to the first FOV of the one or more first images, the one or more processors are further configured to:
   cause the second image sensor to crop the second FOV to match the first FOV.

4. The device of claim 3, wherein to synchronize the second FOV of the one or more second images to the first FOV of the one or more first images further, the one or more processors are further configured to:
   spatially align the second FOV to match the first FOV.

5. The device of claim 2, wherein to synchronize the second resolution of the one or more second images to the first resolution of the one or more first images, the one or more processors are further configured to:
   cause the second image sensor to perform remosaicing on the one or more second images having the synchronized second FOV.

6. The device of claim 2, wherein to synchronize the second resolution of the one or more second images to the first resolution of the one or more first images, the one or more processors are further configured to:
   cause the second image sensor to perform a binning operation on the one or more second images having the synchronized second FOV.

7. The device of claim 1, wherein to generate the first HDR image from the one or more first images, the one or more processors are further configured to generate the first HDR image using a plurality of the one or more first images using a multi-frame HDR technique, and
   wherein to generate the second HDR image from the one or more second images, the one or more processors are further configured to generate the second HDR image using a plurality of the one or more second images using the multi-frame HDR technique.

8. The device of claim 1, wherein to generate the first HDR image from the one or more first images, the one or more processors are further configured to generate the first HDR image using a plurality of the one or more first images using a first HDR technique, and
   wherein to generate the second HDR image from the one or more second images, the one or more processors are further configured to generate the second HDR image using a second HDR technique based on a tone range produced by the first HDR technique.

9. The device of claim 8, wherein the first HDR technique is a multi-frame HDR technique and wherein the second HDR technique is one of a three-exposure HDR technique or an adaptive dynamic range coding (ADRC) technique.

10. The device of claim 8, wherein the first HDR technique and the second HDR technique are different techniques.

11. The device of claim 10, wherein the second HDR technique is an adaptive dynamic range coding (ADRC) technique.

12. The device of claim 1, wherein the one or more processors are further configured to:

apply an image effect to the first HDR image using the depth map.

13. The device of claim 12, wherein the image effect is a bokeh effect.

14. The device of claim 1, further comprising:
the first image sensor;
the second image sensor; and
a display configured to display the first HDR image.

15. A method of camera processing, the method comprising:
receiving, from a first image sensor, one or more first images, wherein the one or more first images have a first field-of-view (FOV) and a first resolution;
generating a first high-dynamic range (HDR) image from the one or more first images;
receiving, from a second image sensor, one or more second images, wherein the one or more second images have a second FOV and a second resolution;
generating a second high-dynamic range (HDR) image from the one or more second images, including performing tone alignment on the one or more second images based on the first HDR image; and
generating a depth map using the first HDR image and the second HDR image.

16. The method of claim 15, further comprising:
synchronizing the second FOV of the one or more second images to the first FOV of the one or more first images; and
synchronizing the second resolution of the one or more second images to the first resolution of the one or more first images, and
wherein generating the second HDR image from the one or more second images occurs after synchronizing the second FOV and synchronizing the second resolution.

17. The method of claim 16, wherein synchronizing the second FOV of the one or more second images to the first FOV of the one or more first images comprises:
causing the second image sensor to crop the second FOV to match the first FOV.

18. The method of claim 17, wherein synchronizing the second FOV of the one or more second images to the first FOV of the one or more first images further comprises:
spatially aligning the second FOV to match the first FOV.

19. The method of claim 16, wherein synchronizing the second resolution of the one or more second images to the first resolution of the one or more first images comprises:
causing the second image sensor to perform remosaicing on the one or more second images having the synchronized second FOV.

20. The method of claim 16, wherein synchronizing the second resolution of the one or more second images to the first resolution of the one or more first images comprises:
causing the second image sensor to perform a binning operation on the one or more second images having the synchronized second FOV.

21. The method of claim 15, wherein generating the first HDR image from the one or more first images comprises generating the first HDR image using a plurality of the one or more first images using a multi-frame HDR technique, and
wherein generating the second HDR image from the one or more second images comprises generating the second HDR image using a plurality of the one or more second images using the multi-frame HDR technique.

22. The method of claim 15, wherein generating the first HDR image from the one or more first images comprises generating the first HDR image using a plurality of the one or more first images using a first HDR technique, and
wherein generating the second HDR image from the one or more second images comprises generating the second HDR image using a second HDR technique based on a tone range produced by the first HDR technique.

23. The method of claim 22, wherein the first HDR technique is a multi-frame HDR technique and wherein the second HDR technique is one of a three-exposure HDR technique or an adaptive dynamic range coding (ADRC) technique.

24. The method of claim 22, wherein the first HDR technique and the second HDR technique are different techniques.

25. The method of claim 24, wherein the second HDR technique is an adaptive dynamic range coding (ADRC) technique.

26. The method of claim 15, further comprising:
applying an image effect to the first HDR image using the depth map.

27. The method of claim 26, wherein the image effect is a bokeh effect.

28. An apparatus configured to perform camera processing, the apparatus comprising:
means for receiving, from a first image sensor, one or more first images, wherein the one or more first images have a first field-of-view (FOV) and a first resolution;
means for generating a first high-dynamic range (HDR) image from the one or more first images;
means for receiving, from a second image sensor, one or more second images, wherein the one or more second images have a second FOV and a second resolution;
means for generating a second high-dynamic range (HDR) image from the one or more second images, including performing tone alignment on the one or more second images based on the first HDR image; and
means for generating a depth map using the first HDR image and the second HDR image.

29. A non-transitory computer-readable storage medium storing instructions that, when executed, cause one or more processors to:
receive, from a first image sensor, one or more first images, wherein the one or more first images have a first field-of-view (FOV) and a first resolution;
generate a first high-dynamic range (HDR) image from the one or more first images;
receive, from a second image sensor, one or more second images, wherein the one or more second images have a second FOV and a second resolution;
generate a second high-dynamic range (HDR) image from the one or more second images, including performing tone alignment on the one or more second images based on the first HDR image; and
generate a depth map using the first HDR image and the second HDR image.

* * * * *